(12) United States Patent
Amano

(10) Patent No.: US 9,164,264 B2
(45) Date of Patent: Oct. 20, 2015

(54) PROJECTION ZOOM LENS AND PROJECTION DISPLAY APPARATUS

(71) Applicant: FUJIFILM Corporation, Tokyo (JP)

(72) Inventor: Masaru Amano, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 283 days.

(21) Appl. No.: 13/952,134

(22) Filed: Jul. 26, 2013

(65) Prior Publication Data

US 2013/0314675 A1  Nov. 28, 2013

Related U.S. Application Data

(63) Continuation of application No. PCT/JP2012/001238, filed on Feb. 23, 2012.

(30) Foreign Application Priority Data

Feb. 24, 2011 (JP) .................................. 2011-038203

(51) Int. Cl.
*G03B 15/14* (2006.01)
*G02B 13/16* (2006.01)
(Continued)

(52) U.S. Cl.
CPC *G02B 15/14* (2013.01); *G02B 3/02* (2013.01); *G02B 7/10* (2013.01); *G02B 13/002* (2013.01);
(Continued)

(58) Field of Classification Search
CPC ...... G02B 15/14; G02B 13/16; G02B 15/177; G02B 15/20; G02B 13/18; G02B 15/15; G02B 15/22; G02B 15/163; G02B 15/24; G02B 13/002; G02B 3/02; G02B 7/10; G02B 13/009; G02B 15/161; G03B 21/14; G03B 2205/0046

See application file for complete search history.

(56) References Cited

U.S. PATENT DOCUMENTS

2005/0200967 A1  9/2005  Yamasaki et al.
2006/0187556 A1  8/2006  Inoko
(Continued)

FOREIGN PATENT DOCUMENTS

JP  2005-266103  9/2005
JP  2006-162700  6/2006
(Continued)

OTHER PUBLICATIONS

Chinese Office Action dated Dec. 22, 2014 in corresponding Chinese Patent Application No. 201280010260.6 with English translation of Chinese Office Action.

*Primary Examiner* — Toan Ton
*Assistant Examiner* — Magda Cruz
(74) *Attorney, Agent, or Firm* — Young & Thompson

(57) ABSTRACT

A six group projection zoom lens downsized with broadened angle of view while aberrations are satisfactorily corrected over the entire zoom range, including a negative lens group having a negative power, a second lens group having a positive power, a third lens group having a positive power, a fourth lens group having a negative power, a fifth lens group having a positive power, and a sixth lens group having a positive power in this order from the magnification side and is configured telecentric on the reduction side. The first and sixth lens groups are fixed while the second to fifth lens groups are moved independently of each other at the time of zooming. The fifth lens group includes a plurality of lenses and a biconvex lens is disposed on the most magnification side. The projection zoom lens satisfies conditional expressions (1): $(R51a+R51b)/(R51a-R51b) \leq 0$ and (2): $25.0 < vd51 < 45.0$.

20 Claims, 18 Drawing Sheets

(51) Int. Cl.
  *G03B 21/14* (2006.01)
  *G02B 15/14* (2006.01)
  *G02B 15/20* (2006.01)
  *G02B 13/18* (2006.01)
  *G02B 15/15* (2006.01)
  *G02B 15/22* (2006.01)
  *G02B 15/163* (2006.01)
  *G02B 15/24* (2006.01)
  *G02B 13/00* (2006.01)
  *G02B 3/02* (2006.01)
  *G02B 7/10* (2006.01)
  *G02B 15/16* (2006.01)
  *G02B 15/177* (2006.01)

(52) U.S. Cl.
  CPC .............. *G02B 13/009* (2013.01); *G02B 13/16* (2013.01); *G02B 13/18* (2013.01); *G02B 15/15* (2013.01); *G02B 15/161* (2013.01); *G02B 15/163* (2013.01); *G02B 15/177* (2013.01); *G02B 15/20* (2013.01); *G02B 15/22* (2013.01); *G02B 15/24* (2013.01); *G03B 21/14* (2013.01); *G03B 21/147* (2013.01)

(56) References Cited

U.S. PATENT DOCUMENTS

| | | | |
|---|---|---|---|
| 2007/0103793 | A1 | 5/2007 | Inoko |
| 2007/0177277 | A1 | 8/2007 | Sugita |
| 2008/0231967 | A1 | 9/2008 | Inoko |
| 2009/0147375 | A1* | 6/2009 | Sudoh et al. .................. 359/684 |
| 2010/0271601 | A1* | 10/2010 | Amano ........................... 353/97 |

FOREIGN PATENT DOCUMENTS

| | | |
|---|---|---|
| JP | 2006-234893 | 9/2006 |
| JP | 2007-206420 | 8/2007 |
| JP | 2007-241184 | 9/2007 |
| JP | 4451516 | 2/2010 |

* cited by examiner

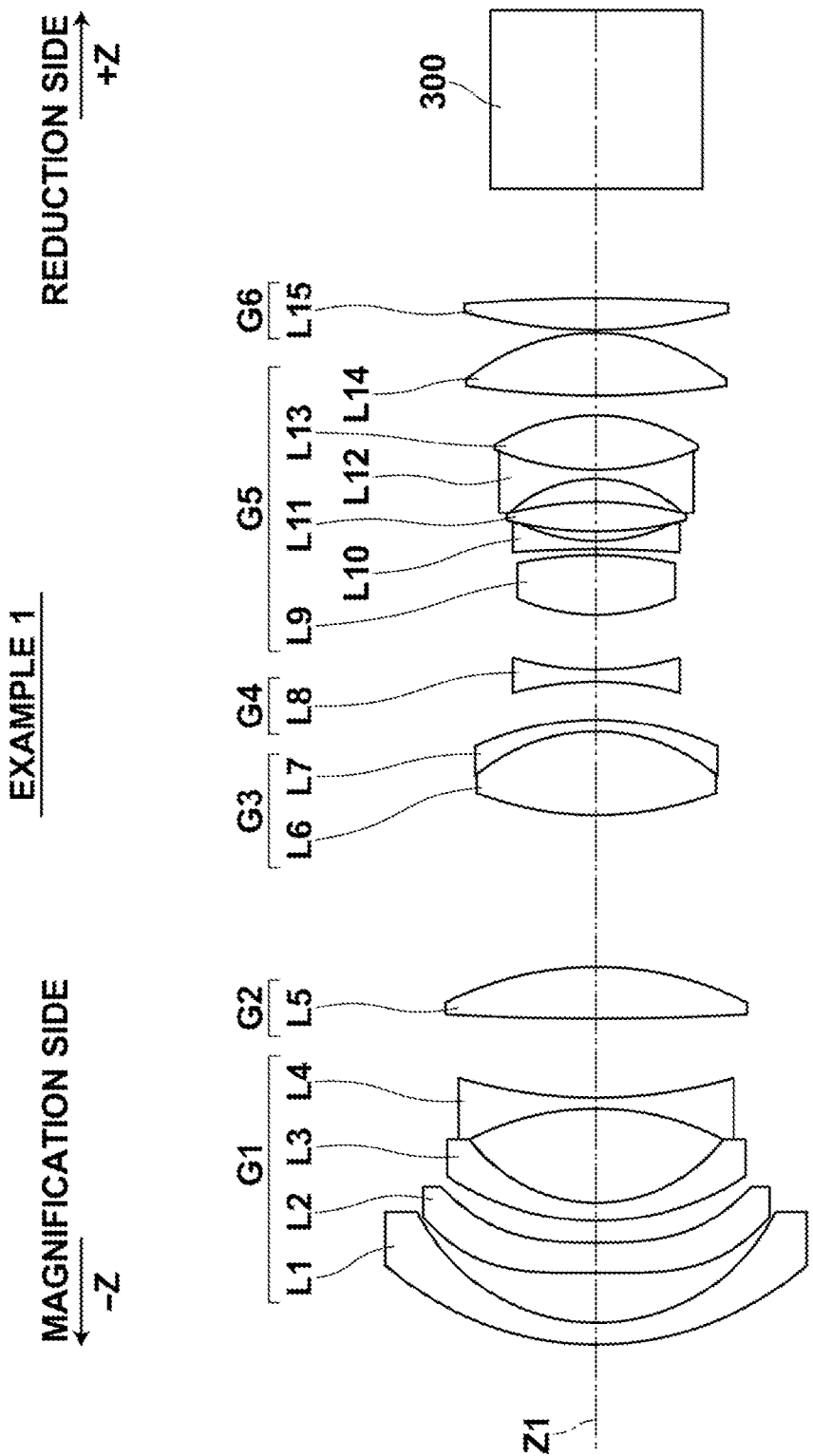

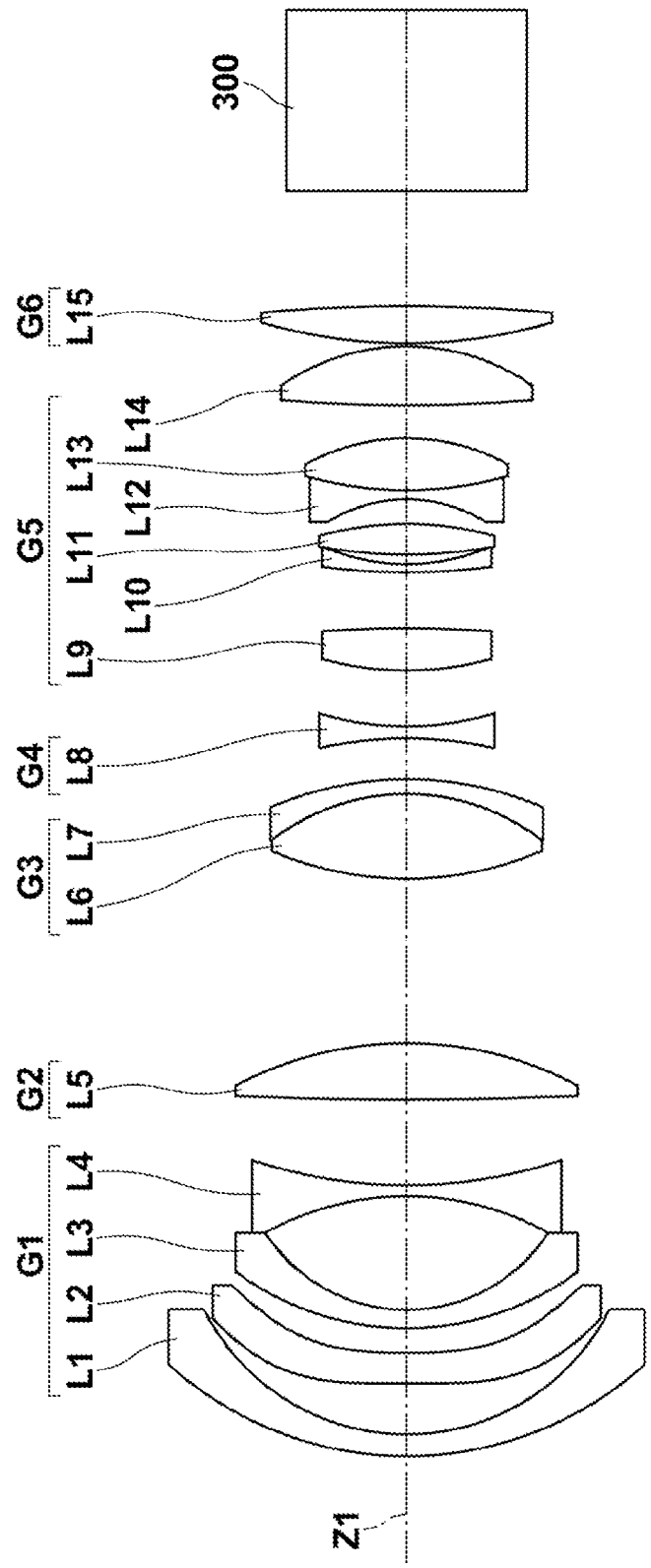

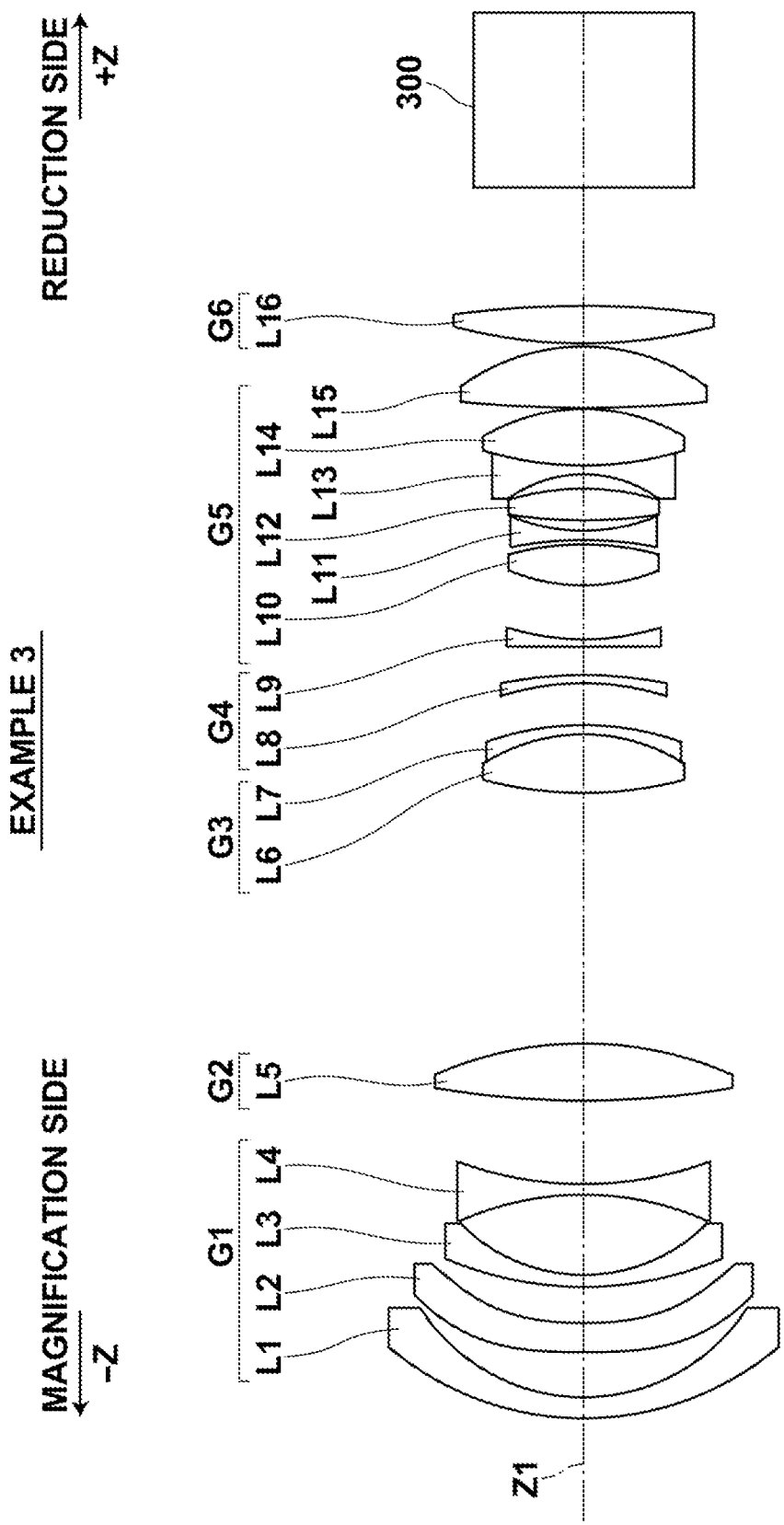

EXAMPLE 3

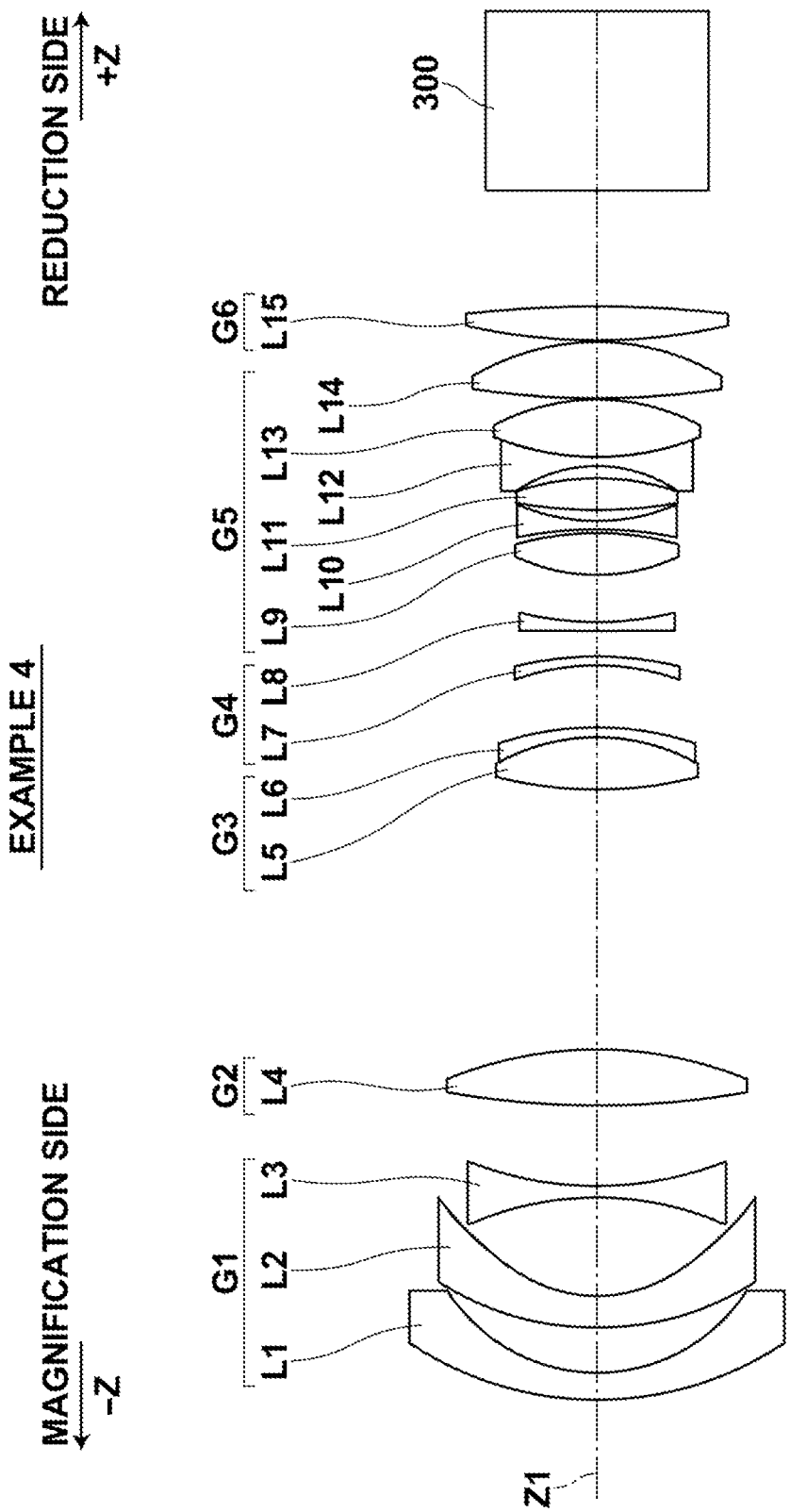

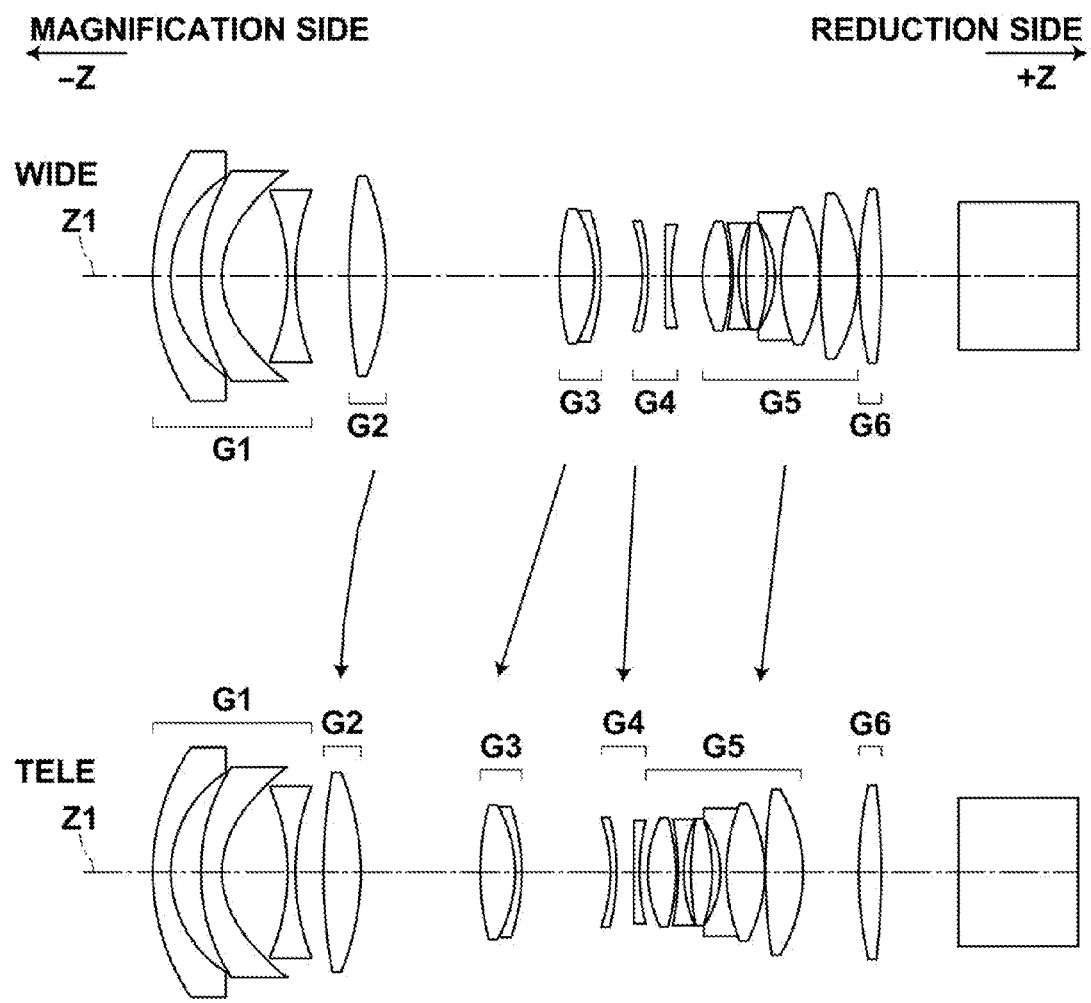

FIG.6 EXAMPLE 1
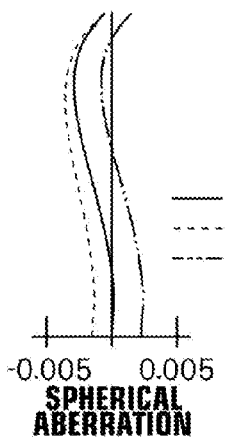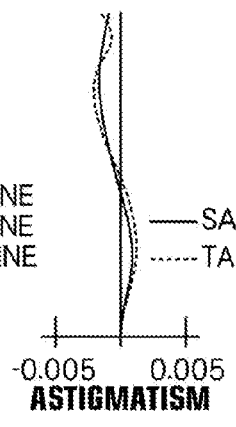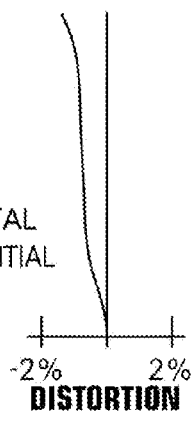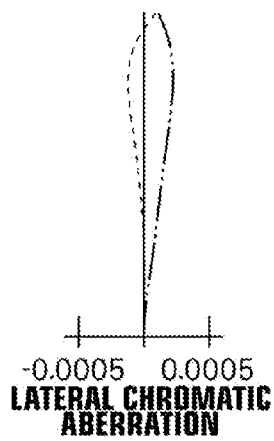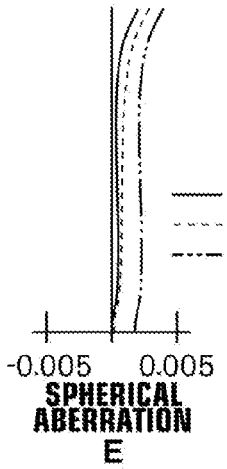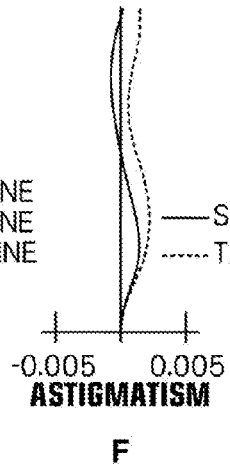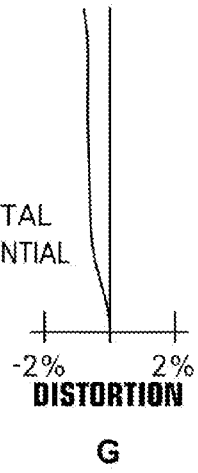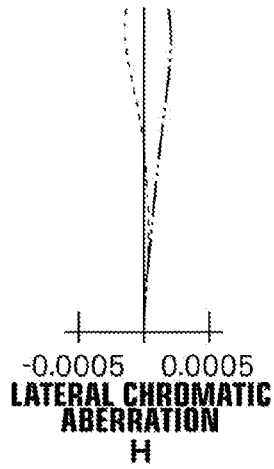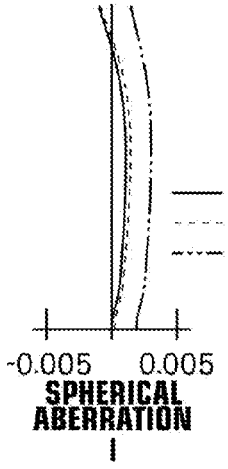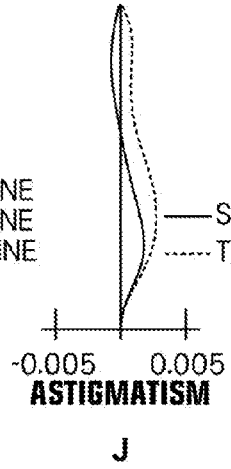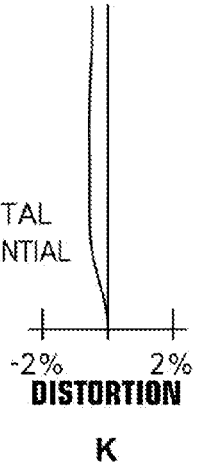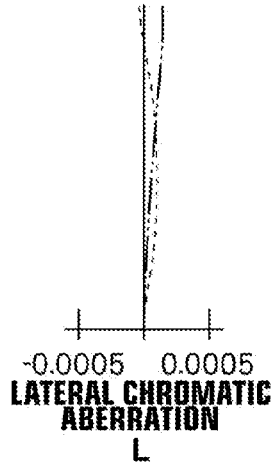

EXAMPLE 1

EXAMPLE 4

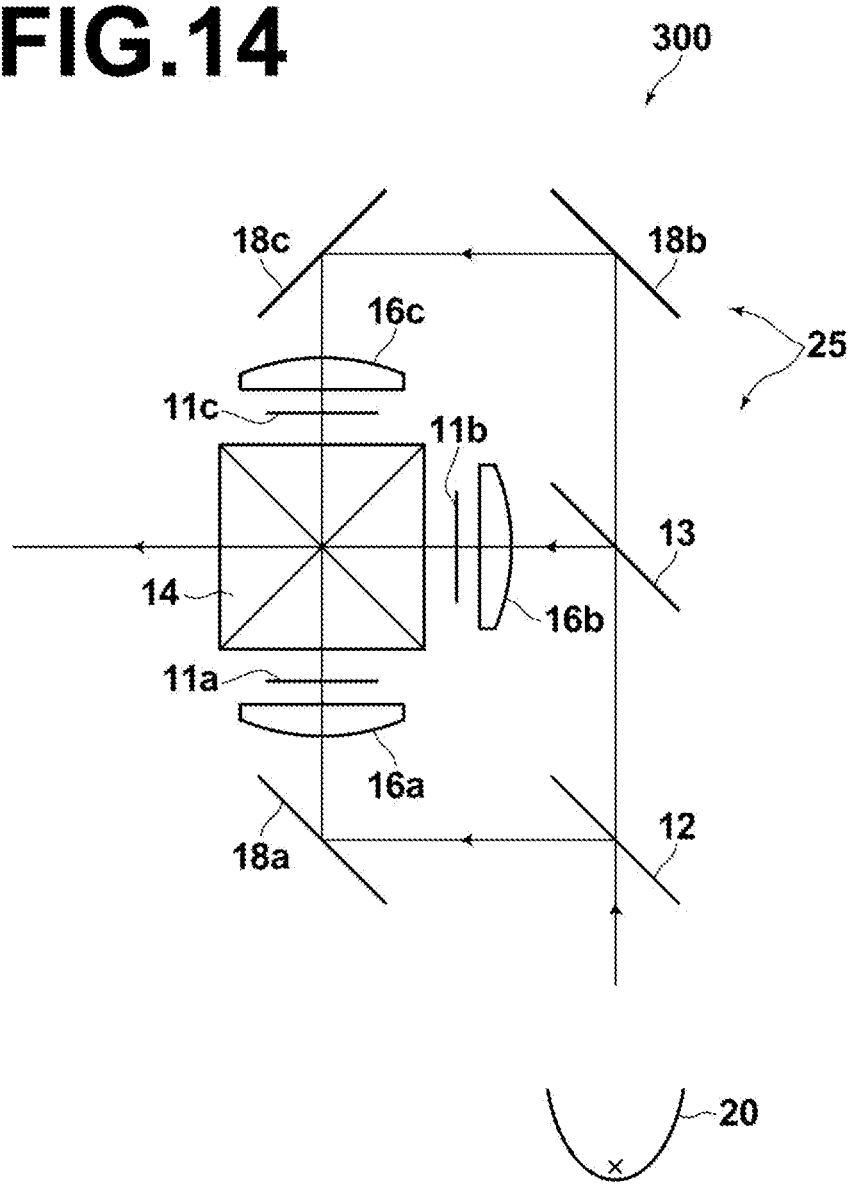

PROJECTION ZOOM LENS AND PROJECTION DISPLAY APPARATUS

CROSS REFERENCE TO RELATED APPLICATIONS

This application is a continuation of PCT/JP2012/001238 filed on Feb. 23, 2012, which claims foreign priority to Japanese application No. 2011-038203 filed on Feb. 24, 2011. The entire contents of each of the above applications are hereby incorporated by reference.

TECHNICAL FIELD

The present invention relates to a projection zoom lens that includes six lens groups and a projection display apparatus using the same.

BACKGROUND ART

Recently, projection display devices using a transmissive or reflective liquid crystal or projection display devices using a light valve, such as DMD display devices, have been used widely.

As a projection zoom lens for use with such projection display devices, a six group zoom lens with four moving groups (moving groups at the time of zooming) configured substantially telecentric on the reduction side is known as described, for example, in Japanese Patent No. 4451516 (Patent Document 1) and Japanese Unexamined Patent Publication No. 2006-162700 (Patent Document 2).

DISCLOSURE OF INVENTION

In the mean time, there is a demand for improvement in the portability and installability for such projection display devices and a projection display device provided with a zoom lens having a sufficiently wide angle of view, e.g., about 70° as the total angle of view, to perform projection over the entire large screen from the near distance is sought.

The projection zoom lens described in Patent Document 1 is a bright lens, but the total angle of view is about 50° which can not be said that it meets the demand for wider angle of view or downsizing. The projection zoom lens described in Patent Document 2 has a total angle of view of about 60° and does not meet the demand for wider angle of view or downsizing as in the projection zoom lens described in Patent Document 1.

The present invention has been developed in view of the circumstances described above, and it is an object of the present invention to provide a projection zoom lens capable of satisfactorily correcting various types of aberrations over the entire zoom range while being downsized and broadened in the angle of view and a projection display apparatus using the same.

A first projection zoom lens of the present invention is a projection zoom lens substantially consisting of a first lens group having a negative power, a second lens group having a positive power, a third lens group having a positive power, a fourth lens group having a negative power, a fifth lens group having a positive power, and a sixth lens group having a positive power arranged in this order from the magnification side and is configured telecentric on the reduction side, wherein:

the projection zoom lens is configured such that the first and sixth lens groups are fixed while the second to fifth lens groups are moved independently of each other along the optical axis at the time of zooming;

the fifth lens group is composed of a plurality of lenses and a biconvex lens is disposed on the most magnification side; and the zoom lens satisfies conditional expressions (1) and (2) given below:

$$(R51a+R51b)/(R51a-R51b) \leq 0 \quad (1) \text{ and}$$

$$25.0 < vd51 < 45.0 \quad (2),$$

where:

$R51a$ is a radius of curvature of the magnification side surface of the lens disposed on the most magnification side in the fifth lens group;

$R51b$ is a radius of curvature of the reduction side surface of the lens disposed on the most magnification side in the fifth lens group; and $vd51$ is an Abbe number of the lens disposed on the most magnification side in the fifth lens group with respect to d-line.

The fifth lens group may be composed of six lenses of a biconvex lens, a negative lens with a concave surface on the reduction side, a positive lens, a negative lens with a concave surface on the magnification side, a positive lens with a convex surface on the reduction side, and a positive lens with a convex surface on the reduction side arranged in this order from the magnification side.

A second projection zoom lens of the present invention is a projection zoom lens substantially consisting of a first lens group having a negative power, a second lens group having a positive power, a third lens group having a positive power, a fourth lens group having a negative power, a fifth lens group having a positive power, and a sixth lens group having a positive power arranged in this order from the magnification side and is configured telecentric on the reduction side, wherein:

the projection zoom lens is configured such that the first and sixth lens groups are fixed while the second to fifth lens groups are moved independently of each other along the optical axis at the time of zooming; and the fifth lens group is composed of six lenses of a biconvex lens, a negative lens with a concave surface on the reduction side, a positive lens, a negative lens with a concave surface on the magnification side, a positive lens with a convex surface on the reduction side, and a positive lens with a convex surface on the reduction side arranged in this order from the magnification side.

The term "telecentric on the reduction side" as used herein refers to that the angle bisector line on the cross-section of each luminous flux converging on an arbitrary point on the reduction side is nearly parallel with the optical axis. That is, this is not limited to the case of being exact telecentric, i.e., the angle bisector line is exactly parallel with the optical axis and includes the case where the angle bisector line is nearly parallel with the optical axis with some errors. The term "with some errors" as used herein refers to that the inclination of the angle bisector line with respect to the optical axis is within ±3°.

The luminous flux cross-section described above is a cross-section cut by a plane passing the optical axis. The angle bisector line is a bisecting line on the cross-section of each converging luminous flux that divides the convergent angle into equal halves.

Preferably, the projection zoom lens satisfies a conditional expression (3): 2.0<f5/fw<7.0, where f5 is a focal length of the fifth lens group and fw is a focal length of the entire system at the wide angle end.

The second lens group may be composed of one positive lens with a convex surface on the reduction side.

Preferably, the projection zoom lens satisfies a conditional expression (4): 2ω>70°, where 2ω is a total angle of view at the wide angle end when projection is performed onto the magnification side.

Preferably, the first lens group has at least one aspherical surface.

In the projection zoom lens, all lenses constituting the second to sixth lens groups may be spherical lenses.

The projection zoom lens maybe configured such that focusing is performed by moving the first lens group in an optical axis direction.

A projection display apparatus of the present invention is a projection display apparatus that includes the projection zoom lens described above, a light source, a light valve, and an illumination optical unit for guiding a luminous flux from the light source to the light valve, wherein the luminous flux from the light source is optically modulated by the light valve and the optically modulated luminous flux is projected onto a screen through the projection zoom lens.

According to the first projection zoom lens and first projection display apparatus of the present invention, the fifth lens group is composed of a plurality of lenses and a biconvex lens is disposed on the most magnification side so that the projection zoom lens satisfies conditional expressions (1) $(R51a+R51b)/(R51a-R51b) \leq 0$ and (2) $25.0 < vd51 < 45.0$. This allows the six group zoom lens to be downsized with broader angle of view while various types of aberrations are satisfactorily corrected over the entire zoom range.

That is, by configuring the projection zoom lens to satisfy the conditional expression (1) and setting the relationship in radius of curvature between the surfaces of the biconvex lens disposed on the most magnification side in the fifth lens group within a predetermined range, various aberrations, including spherical aberration and coma aberration may be corrected satisfactorily.

Further, by configuring the projection zoom lens to satisfy the conditional expression (2) and setting the Abbe number of the biconvex lens disposed on the most magnification side in the fifth lens group, i.e., a positive lens located near the pupil position of the entire lens system (position where the principal ray intersects with the optical axis) with respect to d-line within a predetermined range, various aberrations of each color (e.g., chromatic coma aberration and the like), including axial chromatic aberration may be corrected satisfactorily.

According to the second projection zoom lens and second projection display apparatus of the present invention, the fifth lens group is composed of six lenses: a biconvex lens, a negative lens with a concave surface on the reduction side, a positive lens, a negative lens with a concave surface on the magnification side, a positive lens with a convex surface on the reduction side, and a positive lens with a convex surface on the reduction side arranged in this order from the magnification side. This allows a variation in various types of aberrations arising from zooming to be prevented. Particularly, various types of aberration, in particular, field curvature (particularly, sagittal field curvature) which is problematic in broadening the angle of view of the projection zoom lens maybe effectively prevented by disposing many lenses near the pupil position of the optical system (position where the principal ray intersects with the optical axis). This allows the six group zoom lens to be downsized with broader angle of view while various types of aberrations are satisfactorily corrected over the entire zoom range.

BRIEF DESCRIPTION OF DRAWINGS

FIG. 2A is a cross-sectional view of a projection zoom lens of Example 1.

FIG. 3A is a cross-sectional view of a projection zoom lens of Example 2.

FIG. 4A is a cross-sectional view of a projection zoom lens of Example 3.

FIG. 5A is a cross-sectional view of a projection zoom lens of Example 4.

FIG. 5B comparatively illustrates the positions of each lens group of the projection zoom lens of Example 4 at the wide angle end and telephoto end.

FIG. 6 illustrates various types of aberrations of the projection zoom lens of Example 1.

FIG. 14 illustrates a projection optical modulation unit of a projection display apparatus according to an embodiment of the present invention.

BEST MODE FOR CARRYING OUT THE INVENTION

Hereinafter, a projection zoom lens of the present invention and a projection display apparatus of the present invention using the same will be described with reference to the accompanying drawings.

Figure 1:
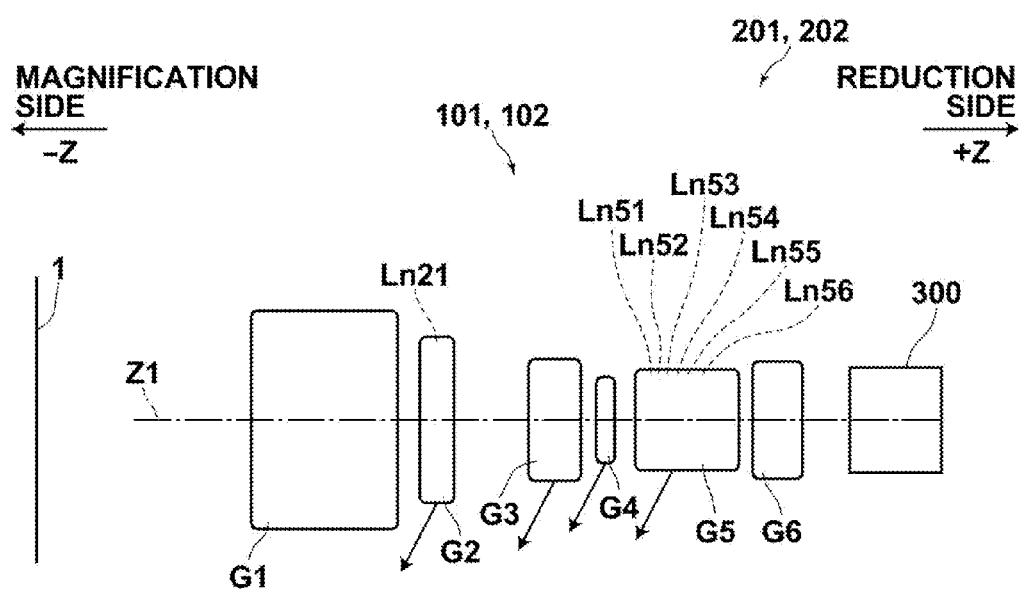
FIG. 1 is a cross-sectional view of a projection zoom lens and projection display apparatus according to an embodiment of the present invention, illustrating a schematic configuration thereof.

FIG. 1 a cross-sectional view commonly illustrating a schematic configuration of a projection zoom lens according to a first embodiment of the present invention and projection display apparatus using the same, and a projection zoom lens according to a second embodiment of the present invention and projection display apparatus using the same.

A projection zoom lens 101 according to the first embodiment of the present invention illustrated in FIG. 1 includes a first lens group G1 having a negative power, a second lens group G2 having a positive power, a third lens group G3 having a positive power, a fourth lens group G4 having a negative power, a fifth lens group G5 having a positive power, and a sixth lens group G6 having a positive power arranged in this order along the optical axis Z1 from the magnification side (side indicated by the arrow −Z in the drawing), and is configured telecentric on the reduction side, in which the projection zoom lens is configured such that the first and sixth lens groups are fixed while the second to fifth lens groups are moved independently of each other along the optical axis at the time of zooming.

The fifth lens group G5 of the projection zoom lens 101 is composed of a plurality of lenses, and a fifth group first lens Ln51, which is a biconvex lens, is disposed on the most magnification side.

The projection zoom lens 101 satisfies a conditional expression (1) (R51a+R51b)/(R51a−R51b)≤0 and a conditional expression (2) 25.0<vd51<45.0, where R51a is a radius of curvature of the magnification side surface of the fifth group first lens Ln51, R51b is a radius of curvature of the reduction side surface of the fifth group first lens Ln51, and vd51 is an Abbe number of the fifth group first lens Ln51 with respect to d-line.

Preferably, the projection zoom lens 101 further satisfies a conditional expression (1A): (R51a+R51b)/(R51a−R51b)≤−0.10 or a conditional expression (2A):30.0<vd51<45.0.

The fifth lens group G5 of the projection zoom lens 101 may be composed of six lenses of the fifth group first lens Ln51 which is a biconvex lens, a fifth group second lens Ln52 which is a negative lens with a concave surface on the reduction side, a fifth group third lens Ln53 which is a positive lens, a fifth group fourth lens Ln54 which is a negative lens with a concave surface on the magnification side, a fifth group fifth lens Ln55 which is a positive lens with a convex surface on the reduction side, and a fifth group sixth lens Ln56 which is a positive lens with a convex surface on the reduction side arranged in this order from the magnification side. This arrangement allows a variation in various types of aberrations arising from zooming to be prevented. Particularly, various types of aberration, in particular, field curvature (particularly, sagittal field curvature) which is problematic in broadening the angle of view of the projection zoom lens may be effectively prevented by disposing many lenses near the pupil position of the optical system (position where the principal ray intersects with the optical axis).

In a lens system which is composed of six lens groups and configured telecentric on the reduction side as in the projection zoom lens of the present invention, it is often the case that the pupil position is in or near the fifth lens group G5.

A projection zoom lens 102 according to the second embodiment of the present invention illustrated in FIG. 1 includes a first lens group G1 having a negative power, a second lens group G2 having a positive power, a third lens group G3 having a positive power, a fourth lens group G4 having a negative power, a fifth lens group G5 having a positive power, and a sixth lens group G6 having a positive power arranged in this order along the optical axis Z1 from the magnification side (side indicated by the arrow −Z in the drawing), and is configured telecentric on the reduction side, in which the projection zoom lens is configured such that the first and sixth lens groups are fixed while the second to fifth lens groups are moved independently of each other along the optical axis at the time of zooming.

The fifth lens group G5 of the projection zoom lens 102 is composed of six lenses of a first group first lens Ln51 which is a biconvex lens, a fifth group second lens Ln52 which is a negative lens with a concave surface on the reduction side, a fifth group third lens Ln53 which is a positive lens, a fifth group fourth lens Ln54 which is a negative lens with a concave surface on the magnification side, a fifth group fifth lens Ln55 which is a positive lens with a convex surface on the reduction side, and a fifth group sixth lens Ln56 which is a positive lens with a convex surface on the reduction side arranged in this order from the magnification side.

Hereinafter, configurations common to the projection zoom lens 101 and the projection zoom lens 102 will be described.

The projection zoom lenses 101 and 102 may be configured to satisfy a conditional expression (3): 2.0<f5/fw<7.0, where f5 is a focal length of the fifth lens group and fw is a focal length of the entire lens system at the wide angle end. If the zoom lens is configured to satisfy the conditional expression (3), coma aberration may be corrected satisfactorily.

Preferably, the projection zoom lenses 101 and 102 are configured to further satisfy a conditional expression (3A): 3.0<f5/fw<6.0.

The second lens group G2 maybe composed of only a second group first lens Ln21 which is a positive lens with a convex surface on the reduction side. Configuration of the second lens group G2 with one lens allows reduction in the device cost of the projection zoom lens.

Preferably, the projection zoom lenses 101 and 102 satisfy a conditional expression (4) : 2ω>70°, where 2ω is a total angle of view at the wide angle end when projection is performed onto the magnification side.

The first lens group G1 may have least one aspherical surface.

All lenses constituting the second lens group G2 to the sixth lens group G6 may be spherical lenses. Configuration of the projection zoom lens in the manner described above allows reduction in the device cost of the projection zoom lens.

In the case where all of the second to sixth lens groups G2 to G6 are composed of spherical lenses, it is preferable that at least one of the surfaces of the lenses constituting the first lens group is aspherical.

The projection zoom lenses 101 and 102 may be configured to perform focusing by moving the first lens group G1 in an optical axis direction. Note that the focusing is performed for correcting an out of focus state of the projection zoom lens that occurs when the projection distance of the projection zoom lens (the distance from a screen 1 to be described later to the projection zoom lens 101 or 102) is changed. In the mean time, at the time of zooming, the second to fifth lens groups G2 to G5 are moved to perform the zooming and focus correction simultaneously.

A projection display apparatus of the present invention using the aforementioned projection zoom lens will now be described.

A projection display apparatus 201 according to the first embodiment of the present invention illustrated in FIG. 1 includes the projection zoom lens 101 according to the first embodiment and a projection optical modulation unit 300 for optically modulating a luminous flux emitted from a light source with a light valve, in which the luminous flux optically modulated by the projection optical modulation unit 300 is projected onto a screen 1 through the projection zoom lens 101.

A projection display apparatus 202 according to the second embodiment of the present invention illustrated in FIG. 1 includes the projection zoom lens 102 according to the second embodiment and a projection optical modulation unit 300 for optically modulating a luminous flux emitted from a light source with a light valve, in which the luminous flux optically modulated by the projection optical modulation unit 300 is projected onto a screen 1 through the projection zoom lens 102.

An example of the projection optical modulation unit 300 will be described with reference to FIG. 14.

The projection optical modulation unit 300 illustrated in FIG. 14 includes a light source 20, transmissive liquid crystal panels 11a, 11b, and 11c, which are light valves, an illumination optical unit 25 for guiding a luminous flux emitted from the light source 20 to each of the transmissive liquid crystal panels 11a to 11c, and a cross dichroic prism 14 which is a luminous flux combining optical system for combining luminous fluxes passing through the transmissive liquid crystal panels 11a to 11c. The illumination optical unit 25 includes an integrator (not shown) such as a fly's eye disposed between the light source 20 and dichroic mirror 12.

A white luminous flux emitted from the light source 20 is separated into three luminous fluxes of different colors (G light, B light, R light) through the illumination optical unit 25 and separated luminous fluxes are inputted to the corresponding liquid crystal panels 11a to 11c and optically modulated.

The respective luminous fluxes optically modulated through the liquid crystal panels 11a to 11c are color-combined by the cross dichroic prism 14 and the combined luminous flux is projected on to the screen 1 through the projection zoom lens 101 or 102.

The illumination optical unit 25 of the projection optical modulation unit 300 includes dichroic mirrors 12, 13, total reflection mirrors 18a, 18b, 18c, and condenser lenses 16a, 16b, 16c for color separation.

The projection optical modulation unit 300 is not limited to that using the transmissive liquid crystal display panels described above, and other optical modulation means, such as reflective liquid crystal display panels, DMDs, or the like may also be employed.

EXAMPLES

Hereinafter, specific Examples 1 to 4 of the projection zoom lens of the present invention will be described.

Note that Examples 1, 2, 3 and 4 are included in the first and second embodiments of the present invention.

Example 1

Figure 2B:
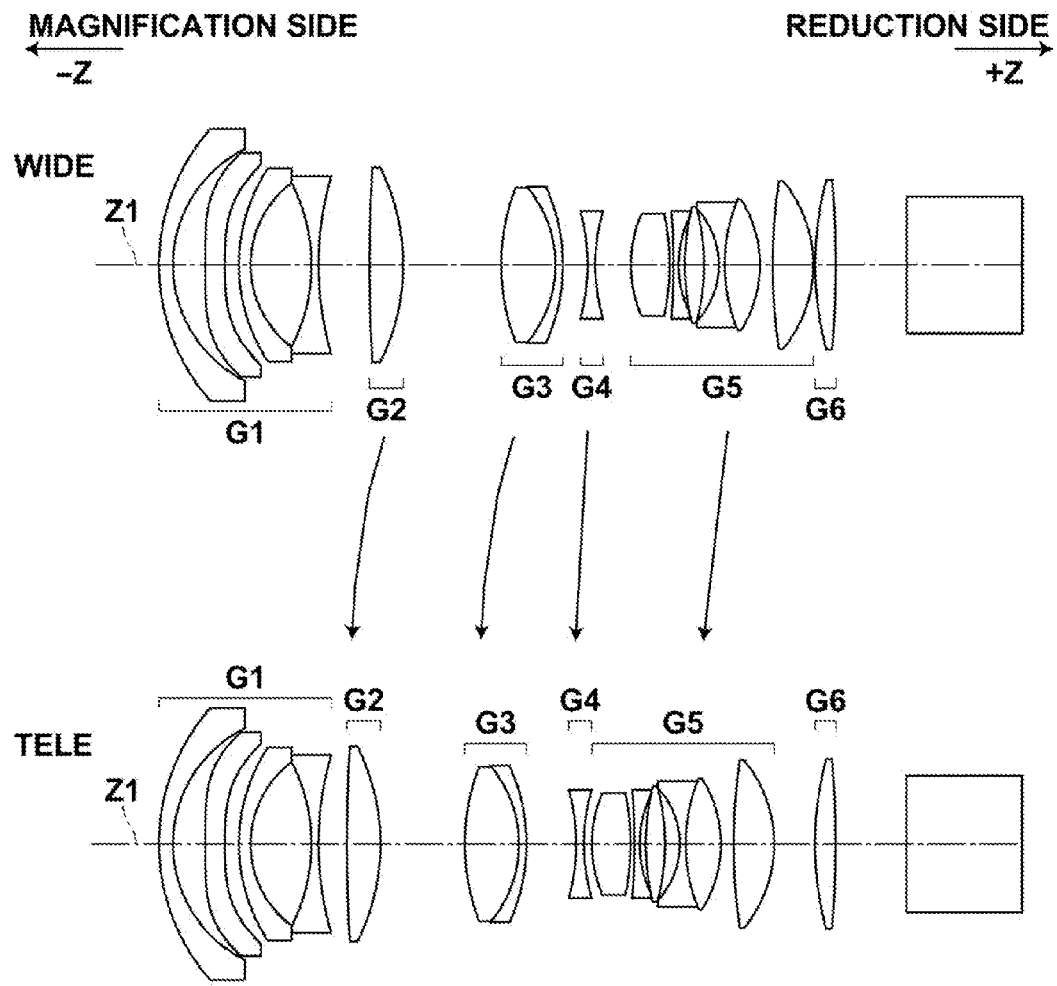
FIG. 2B comparatively illustrates the positions of each lens group of the projection zoom lens of Example 1 at the wide angle end and telephoto end.

FIGS. 2A, 2B illustrate a projection zoom lens of Example 1. FIG. 2A illustrates the projection zoom lens in detail and FIG. 2B comparatively illustrates the positions of each lens group of the projection zoom lens of Example 1 at the wide angle end (indicated by "WIDE" in the drawing) and telephoto end (indicated by "TELE" in the drawing).

The projection zoom lens of Example 1 includes six les groups . The first lens group G1 is composed of four lenses of a first group first lens L1 to a first group fourth lens L4, the second lens group G2 is composed of one lens of a second group first lens L5, the third lens group G3 is composed of two lenses of a third group first lens L6 and a third group second lens L7.

The fourth lens group G4 is composed of one lens of a fourth group first lens L8, the fifth lens group G5 is composed of six lenses of a fifth group first lens L9 to fifth group sixth lens L14, and the sixth lens group G6 is composed of one lens of a sixth group first lens L15.

The third group first lens L6 and the third group second lens L7 are cemented, and fifth group fourth lens L12 and the fifth group fifth lens L13 are cemented, thereby each forming a cemented lens.

At the time of zooming, the first lens group G1 and the sixth lens group G6 are fixed, while the second lens group G2 to the fifth lens group G5 are moved independently of each other along the optical axis Z1 along with a transition from the wide angle end to the telephoto end. The movement of each lens group at the time of zooming or focusing is roughly identical in other examples described hereinafter.

The Lens data and other data of the projection zoom lens of Example 1 are shown in Table 1.

The focal length F of the entire lens system, radius of curvature R of each lens surface, center thickness of each lens and air distance D between each lens, refractive index Nd and Abbe number vd of each lens with respect to d-line are shown on the upper side of Table 1. Note that the radius of curvature R is a normalized value with the focal length of the entire lens system at the wide angle end being taken as "1". The air distance D is also a value normalized in the same manner as in the radius of curvature R.

The focal length F indicates values at the wide angle end (WIDE), in the middle of zooming (MIDDLE), and at the telephoto end (TELE) in this order.

Each number under the "SURFACE No." in Table 1 and each table to be described later is the number of each lens surface, aperture stop, or the like, which is sequentially increased from the most magnification side (the side indicated by the arrow −Z in the drawing) to the reduction side (the side indicated by the arrow +Z in the drawing). Values under the symbols "R", "D", "Nd", and "vd" are values indicated in association with each "SURFACE No.".

Note the lens data include the projection optical modulation unit 300 as a plane parallel plate.

The distances between each lens group at the wide angle end (WIDE), in the middle of zooming (MIDDLE), and the telephoto end (TELE) are shown in the center of Table 1.

Aspherical surface coefficients of the lens surfaces corresponding to the surface numbers 3 and 4 (lens surfaces of the first group second lens L2) are shown in the lower side of Table 1.

An aspherical surface expression used herein is given below:

$$Z = \frac{Y^2/R}{1 + (1 - K \cdot Y^2/R^2)^{1/2}} + \sum_{i=3}^{n} A_i \cdot Y^i$$

where:

Z is a depth of aspherical surface (a length of the vertical line from a point on the aspherical surface at height Y to a tangent plane to the vertex of the aspherical surface orthogonal to the optical axis) (mm), Y is a height (distance from the optical axis) (mm), p R is a paraxial radius of curvature, and K, Ai are aspherical surface coefficients (i=3 to n).

The above description with respect to the lens data and other data applies also to other examples shown hereinafter.

TABLE 1

| EXAMPLE 1 | | | | |
|---|---|---|---|---|
| F. LENGTH F = 1.00~1.15~1.25 | | | | |
| SURFACE No. | R | D | Nd | vd |
| 1 | 2.731 | 0.184 | 1.8052 | 25.42 |
| 2 | 1.713 | 0.428 | | |
| 3* | ∞ | 0.255 | 1.4910 | 57.58 |

TABLE 1-continued

EXAMPLE 1

| | | | | |
|---|---|---|---|---|
| 4* | 5.766 | 0.189 | | |
| 5 | 2.331 | 0.153 | 1.6180 | 63.33 |
| 6 | 1.356 | 0.806 | | |
| 7 | -2.380 | 0.092 | 1.4970 | 81.54 |
| 8 | 4.188 | D8 | | |
| 9 | 22.305 | 0.445 | 1.8040 | 46.57 |
| 10 | -2.886 | D10 | | |
| 11 | 2.856 | 0.716 | 1.5955 | 39.24 |
| 12 | -1.606 | 0.100 | 1.8467 | 23.78 |
| 13 | -2.495 | D13 | | |
| 14 | -2.712 | 0.102 | 1.5174 | 52.43 |
| 15 | 2.579 | D15 | | |
| 16 | 1.709 | 0.511 | 1.6129 | 37.00 |
| 17 | -3.235 | 0.050 | | |
| 18 | -9.712 | 0.068 | 1.8061 | 40.92 |
| 19 | 1.491 | 0.083 | | |
| 20 | 3.173 | 0.254 | 1.6204 | 60.29 |
| 21 | -2.927 | 0.196 | | |
| 22 | -1.103 | 0.077 | 1.8000 | 29.84 |
| 23 | 2.271 | 0.466 | 1.4970 | 81.54 |
| 24 | -1.630 | 0.168 | | |
| 25 | 7.524 | 0.537 | 1.4970 | 81.54 |
| 26 | -1.748 | D26 | | |
| 27 | 4.370 | 0.272 | 1.7432 | 49.34 |
| 28 | -12.740 | 0.936 | | |
| 29 | ∞ | 1.528 | 1.5163 | 64.14 |
| 30 | ∞ | | | |

| MOV. DISTANCE | WIDE | MIDDLE | TELE |
|---|---|---|---|
| D8 | 0.675 | 0.471 | 0.375 |
| D10 | 1.296 | 1.171 | 1.114 |
| D13 | 0.325 | 0.522 | 0.656 |
| D15 | 0.470 | 0.258 | 0.105 |
| D26 | 0.025 | 0.368 | 0.539 |
| PROJ. DISTANCE | 102.194 | 117.524 | 127.743 |

ASPHE. COEFF.

SURFACE No. = 3

| K | A3 | A4 | A5 | A6 |
|---|---|---|---|---|
| 177.76156 | -0.07535 | 0.33681 | -0.11500 | -0.12621 |
| A7 | A8 | A9 | A10 | A11 |
| 0.07248 | 0.07140 | -0.04014 | -0.03523 | 0.03280 |
| A12 | | | | |
| -0.00751 | | | | |

SURFACE No. = 4

| K | A3 | A4 | A5 | A6 |
|---|---|---|---|---|
| 2.84986 | -0.06234 | 0.27947 | 0.04947 | -0.35437 |
| A7 | A8 | A9 | A10 | A11 |
| 0.22443 | 0.03981 | -0.04125 | -0.02801 | 0.01561 |
| A12 | | | | |
| -0.00103 | | | | |

*indicates aspherical surface. R value of aspherical surface is paraxial radius of curvature.

FIG. 6 illustrates spherical aberrations, astigmatisms, distortions, and lateral chromatic aberrations of the projection zoom lens of Example 1 at the wide angle end (WIDE), in the middle of zooming (MIDDLE), and the telephoto end (TELE). FIG. 6 includes aberrations with respect to d-line, F-line and C-line. Each astigmatism diagram illustrates aberrations with respect to sagittal and tangential image planes.

In FIG. 6, the diagrams represented by the symbols A, E and I illustrate spherical aberrations, the diagrams represented by the symbols B, F, and J illustrate astigmatisms, the diagrams represented by the symbols C, G, and K illustrate distortions, and the diagrams represented by the symbols D, H, and L illustrate lateral chromatic aberrations.

Figure 10:
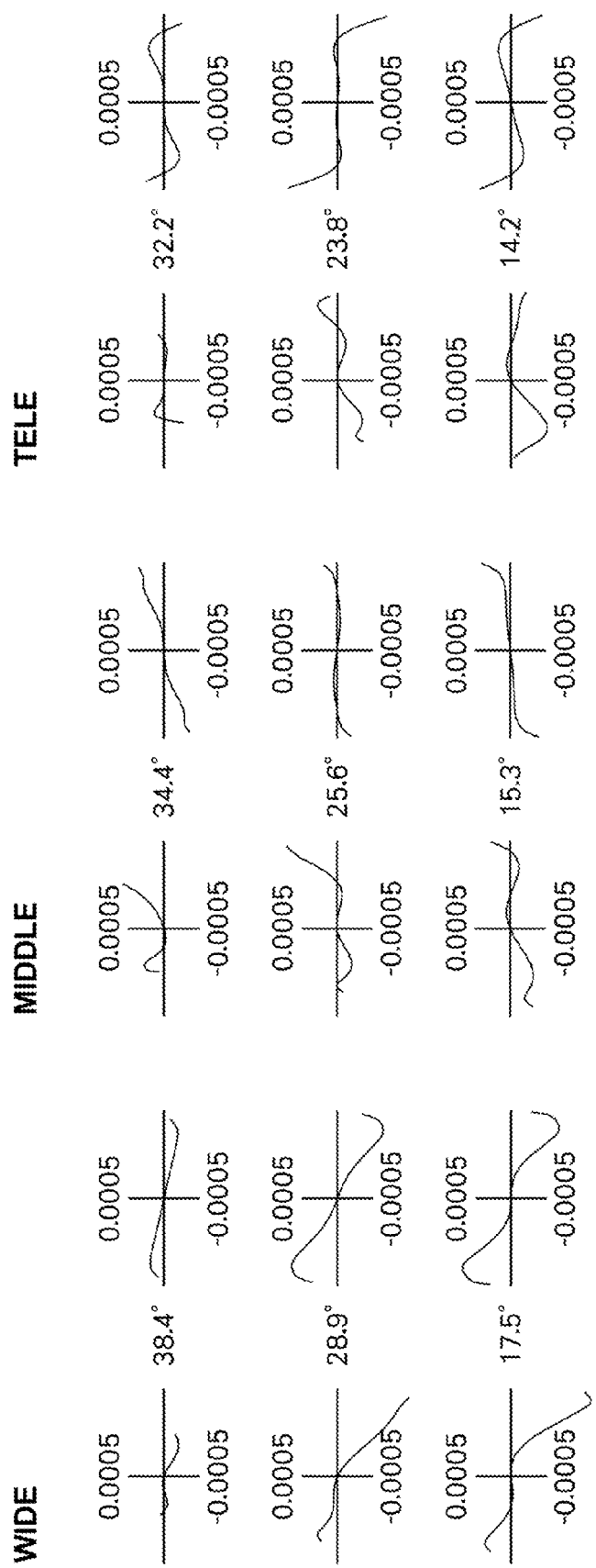
FIG. 10 illustrates lateral aberrations of the projection zoom lens of Example 1.

FIG. 10 illustrates lateral aberrations of the projection zoom lens of Example 1 with respect to d-line at the wide angle end (WIDE), in the middle of zooming (MIDDLE), and the telephoto end (TELE). FIG. 10 illustrates aberrations with respect to three different half angles of view as the lateral aberrations. Aberration diagrams with respect to the same half angle of view in the tangential direction and sagittal direction are shown side by side in the horizontal direction in this order.

The above description with respect to the aberration diagrams applies also to other examples shown hereinafter.

As is known from FIGS. 6, 10, and the like, the projection zoom lens of Example 1 has a wide angle of view 2ω of 76.8 degrees with a bright F value of 1.81, and each aberration is corrected satisfactorily.

As is known from Table 5 that indicates the value of each of the conditional expressions for each example, the projection zoom lens of Example 1 satisfies all of the conditional expressions (1) to (4). Such projection zoom lens of Example 1 allows downsizing with a broadened angle of view while various types of aberrations are satisfactorily corrected over the entire zoom range.

Example 2

Figure 3B:
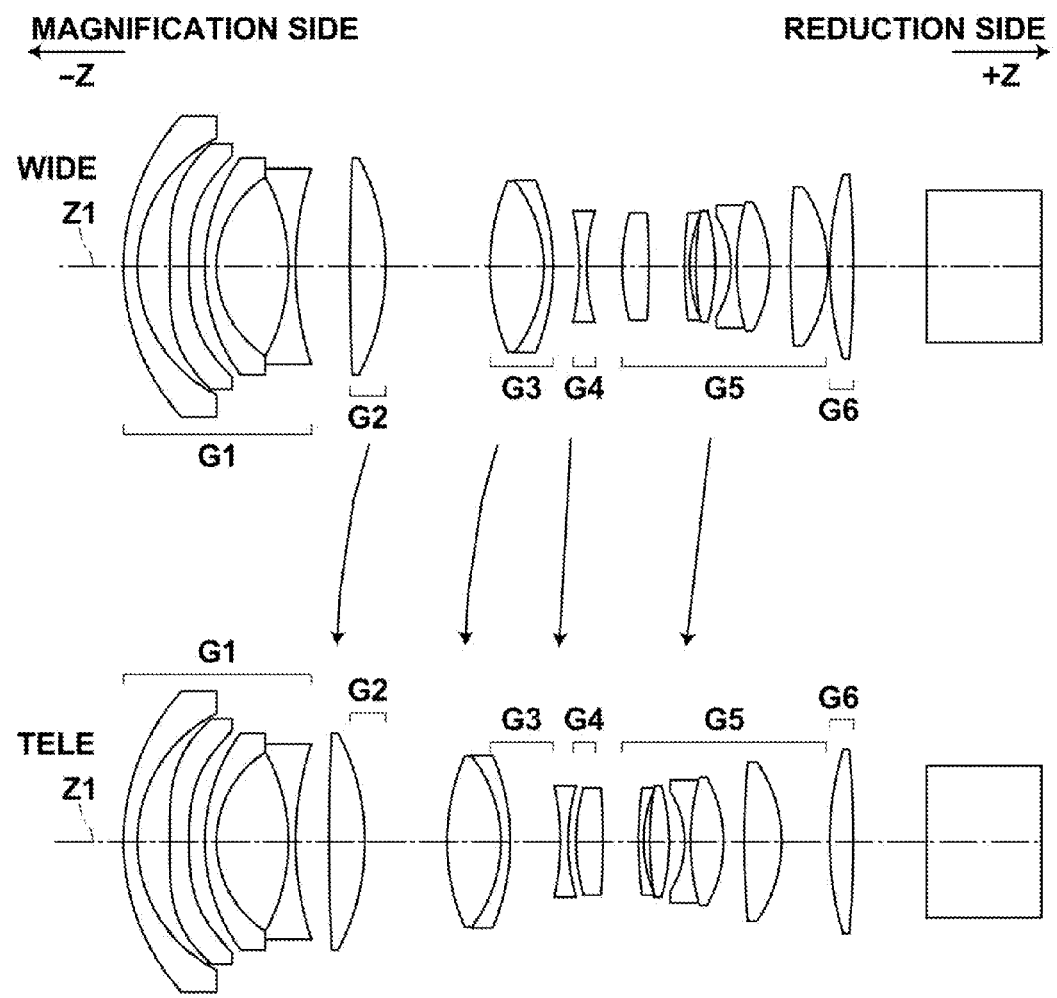
FIG. 3B comparatively illustrates the positions of each lens group of the projection zoom lens of Example 2 at the wide angle end and telephoto end.

FIGS. 3A, 3B illustrate a projection zoom lens of Example 2. FIG. 3A illustrates the projection zoom lens in detail and FIG. 3B comparatively illustrates the positions of each lens group of the projection zoom lens of Example 2 at the wide angle end (indicated by "WIDE" in the drawing) and telephoto end (indicated by "TELE" in the drawing). The projection zoom lens of Example 2 also includes six lens groups.

The first lens group G1 is composed of four lenses of a first group first lens L1 to a first group fourth lens L4, the second lens group G2 is composed of one lens of a second group first lens L5, the third lens group G3 is composed of two lenses of a third group first lens L6 and a third group second lens L7.

The fourth lens group G4 is composed of one lens of a fourth group first lens L8, the fifth lens group G5 is composed of six lenses of a fifth group first lens L9 to fifth group sixth lens L14, and the sixth lens group G6 is composed of one lens of a sixth group first lens L15.

The third group first lens L6 and the third group second lens L7 are cemented, and fifth group fourth lens L12 and the fifth group fifth lens L13 are cemented, thereby each forming a cemented lens.

The Lens data and other data of the projection zoom lens of Example 2 are shown in Table 2. The lens data and other data in the table are presented in the same way as in Example 1.

TABLE 2

EXAMPLE 2

F. LENGTH F = 1.00~1.15~1.25

| SURFACE No. | R | D | Nd | νd |
|---|---|---|---|---|
| 1 | 2.988 | 0.184 | 1.8052 | 25.42 |
| 2 | 1.912 | 0.430 | | |
| 3* | 150.735 | 0.255 | 1.4910 | 57.58 |
| 4* | 5.231 | 0.211 | | |
| 5 | 2.431 | 0.153 | 1.6180 | 63.33 |
| 6 | 1.416 | 0.960 | | |
| 7 | -2.453 | 0.092 | 1.4970 | 81.54 |
| 8 | 4.129 | D8 | | |
| 9 | 33.285 | 0.476 | 1.8040 | 46.57 |
| 10 | -3.093 | D10 | | |
| 11 | 2.892 | 0.715 | 1.5955 | 39.24 |
| 12 | -1.859 | 0.125 | 1.8467 | 23.78 |
| 13 | -2.899 | D13 | | |
| 14 | -3.452 | 0.102 | 1.5317 | 48.84 |
| 15 | 2.579 | D15 | | |

TABLE 2-continued

EXAMPLE 2

| | | | | |
|---|---|---|---|---|
| 16 | 2.628 | 0.357 | 1.5955 | 39.24 |
| 17 | −10.126 | 0.472 | | |
| 18 | 5.469 | 0.068 | 1.7620 | 40.10 |
| 19 | 1.764 | 0.081 | | |
| 20 | 4.069 | 0.260 | 1.4970 | 81.54 |
| 21 | −2.674 | 0.206 | | |
| 22 | −1.251 | 0.077 | 1.8000 | 29.84 |
| 23 | 3.129 | 0.439 | 1.4970 | 81.54 |
| 24 | −1.758 | 0.276 | | |
| 25 | 12.675 | 0.497 | 1.4970 | 81.54 |
| 26 | −1.863 | D26 | | |
| 27 | 4.301 | 0.315 | 1.7859 | 44.20 |
| 28 | −13.680 | 0.973 | | |
| 29 | ∞ | 1.525 | 1.5163 | 64.14 |
| 30 | ∞ | | | |

| MOV. DISTANCE | WIDE | MIDDLE | TELE |
|---|---|---|---|
| D8 | 0.721 | 0.530 | 0.4457 |
| D10 | 1.386 | 1.202 | 1.0920 |
| D13 | 0.343 | 0.536 | 0.6646 |
| D15 | 0.470 | 0.245 | 0.1053 |
| D26 | 0.025 | 0.430 | 0.6354 |
| PROJ. DISTANCE | 102.039 | 117.345 | 127.549 |

ASPHE. COEFF.

SURFACE No. = 3

| K | A3 | A4 | A5 | A6 |
|---|---|---|---|---|
| 8123.87487 | −0.06729 | 0.27710 | −0.03035 | −0.17821 |
| A7 | A8 | A9 | A10 | A11 |
| 0.06165 | 0.08080 | −0.03108 | −0.03643 | 0.02735 |
| A12 | | | | |
| −0.00542 | | | | |

SURFACE No. = 4

| K | A3 | A4 | A5 | A6 |
|---|---|---|---|---|
| 2.72812 | −0.05444 | 0.22017 | 0.11710 | −0.35800 |
| A7 | A8 | A9 | A10 | A11 |
| 0.15932 | 0.05686 | −0.01888 | −0.03099 | 0.00980 |
| A12 | | | | |
| 0.00080 | | | | |

*indicates aspherical surface. R value of aspherical surface is paraxial radius of curvature.

Figure 7:
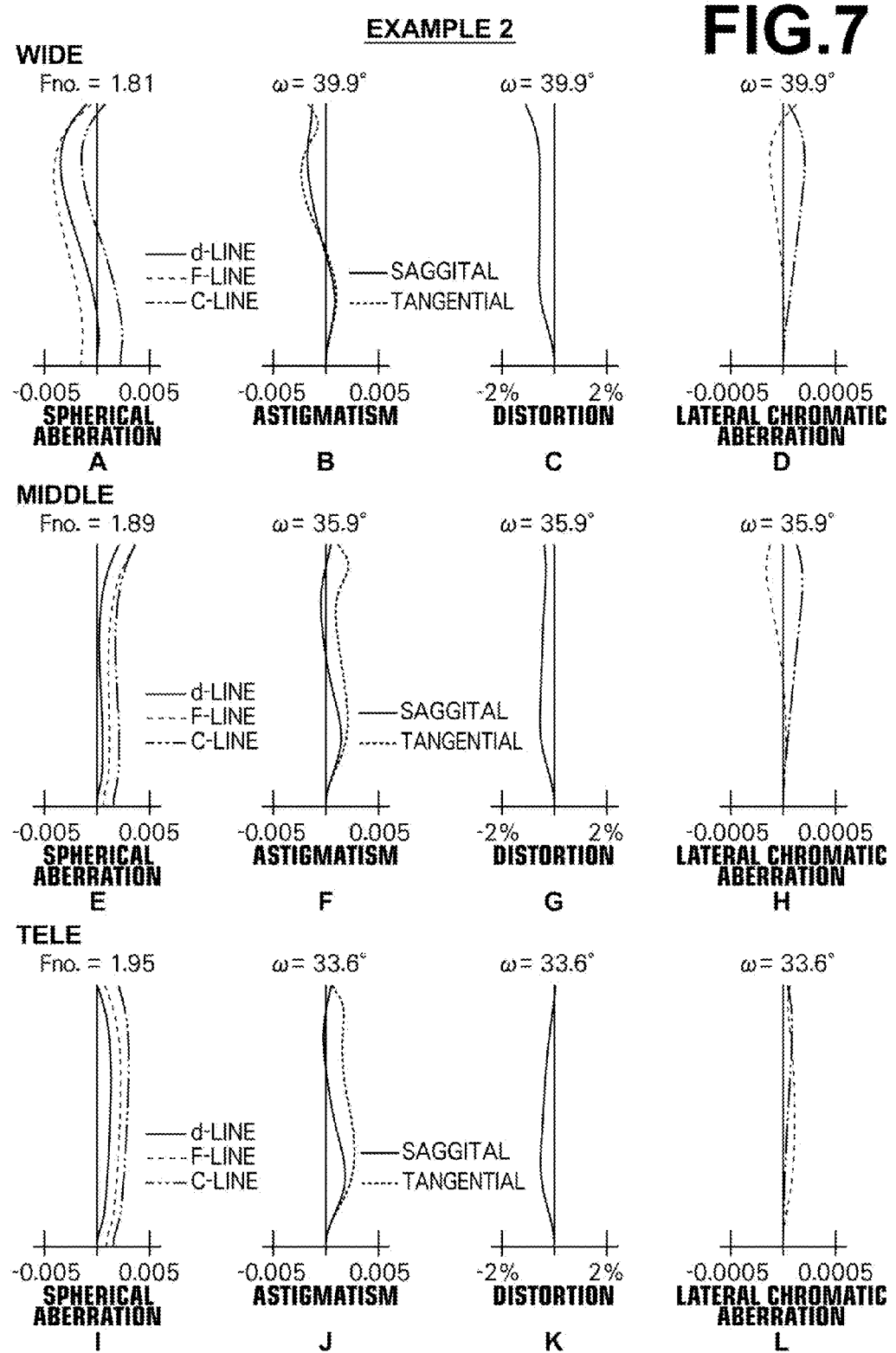
FIG. 7 illustrates various types of aberrations of the projection zoom lens of Example 2.
Figure 11:
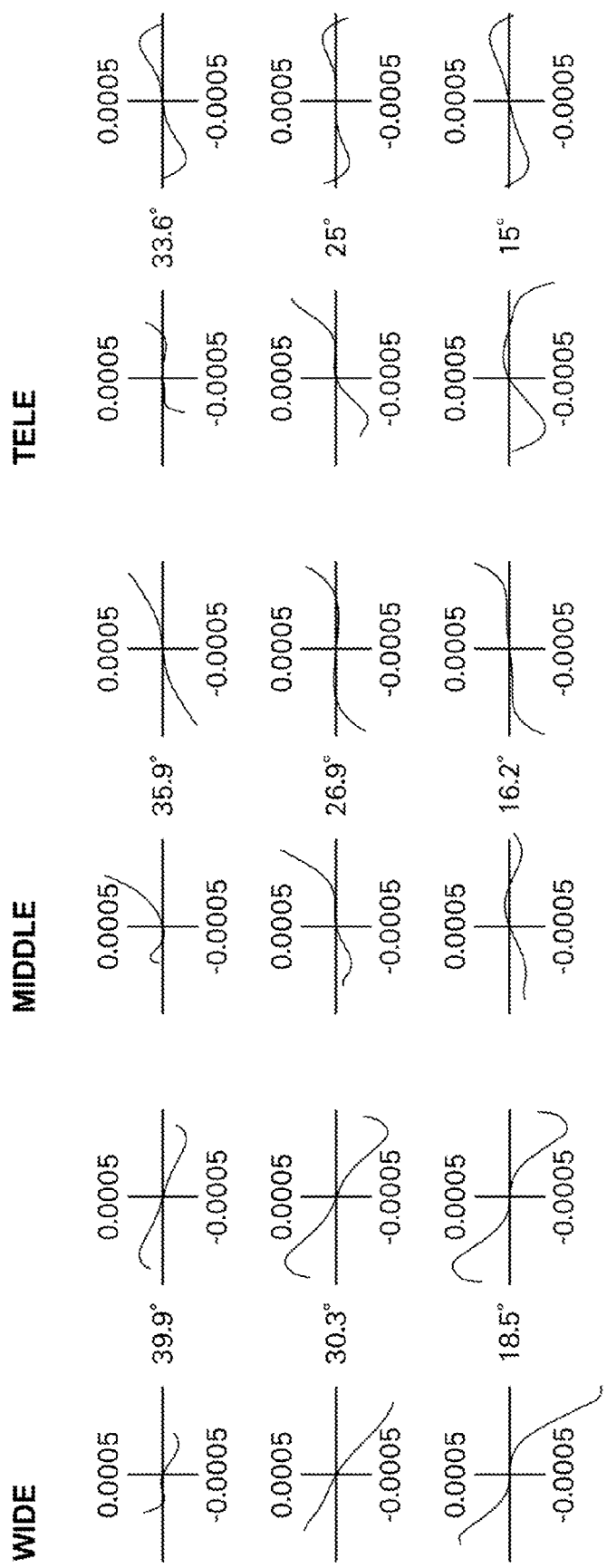
FIG. 11 illustrates lateral aberrations of the projection zoom lens of Example 2.

FIG. 7 illustrates various types of aberrations and FIG. 11 illustrates lateral aberration diagrams of the projection zoom lens of Example 2. These drawings are presented in the same way as in Example 1.

As is known from FIGS. 7, 11, and the like, the projection zoom lens of Example 2 has a wide angle of view 2ω of 79.8 degrees with a bright F value of 1.81, and each aberration is corrected satisfactorily.

As is known from Table 5 that indicates the value of each of the conditional expressions for each example, the projection zoom lens of Example 2 satisfies all of the conditional expressions (1) to (4). Such six group projection zoom lens of Example 2 allows downsizing with a broadened angle of view while various types of aberrations are satisfactorily corrected over the entire zoom range.

Example 3

Figure 4B:
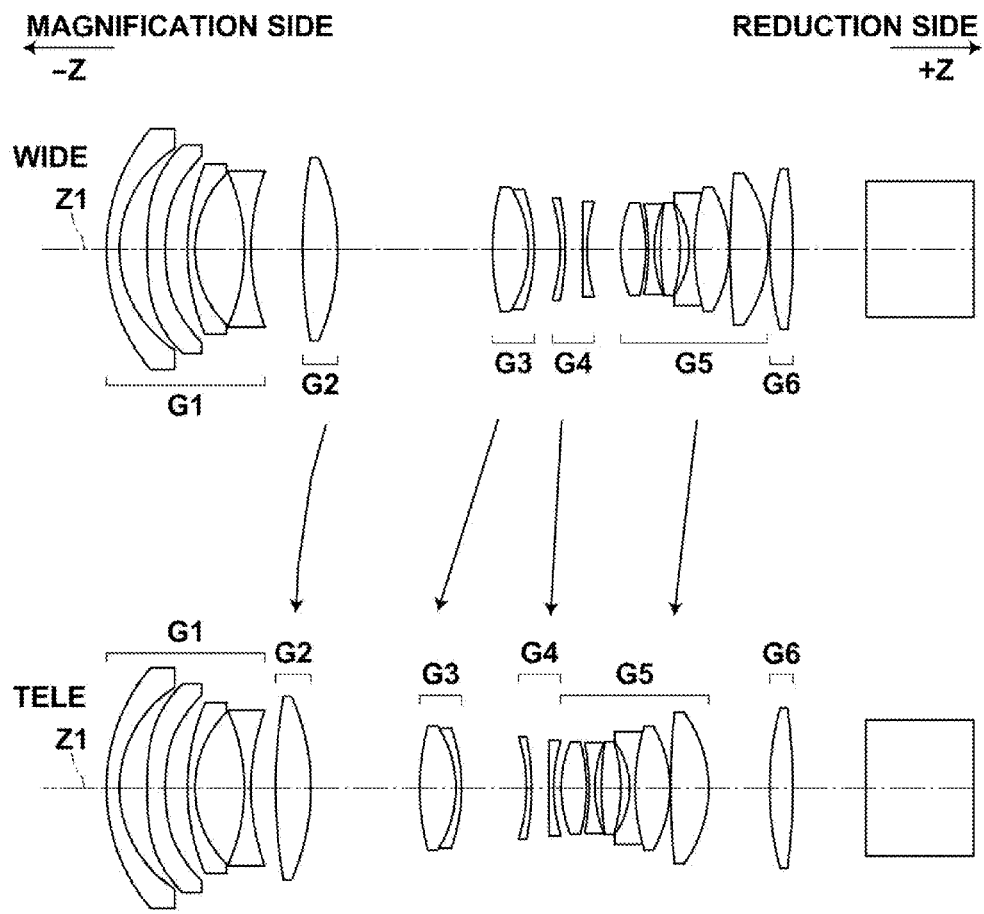
FIG. 4B comparatively illustrates the positions of each lens group of the projection zoom lens of Example 3 at the wide angle end and telephoto end.

FIGS. 4A, 4B illustrate a projection zoom lens of Example 3. FIG. 4A illustrates the projection zoom lens in detail and FIG. 4B comparatively illustrates the positions of each lens group of the projection zoom lens of Example 3 at the wide angle end (indicated by "WIDE" in the drawing) and telephoto end (indicated by "TELE" in the drawing). The projection zoom lens of Example 3 also includes six lens groups.

The first lens group G1 is composed of four lenses of a first group first lens L1 to a first group fourth lens L4, the second lens group G2 is composed of one lens of a second group first lens L5, the third lens group G3 is composed of two lenses of a third group first lens L6 and a third group second lens L7.

The fourth lens group G4 is composed of two lenses of a fourth group first lens L8 and a fourth group second lens L9, the fifth lens group G5 is composed of six lenses of a fifth group first lens L10 to fifth group sixth lens L15, and the sixth lens group G6 is composed of one lens of a sixth group first lens L16.

The third group first lens L6 and the third group second lens L7 are cemented, and fifth group fourth lens L13 and the fifth group fifth lens L14 are cemented, thereby each forming a cemented lens.

The Lens data and other data of the projection zoom lens of Example 3 are shown in Table 3. The lens data and other data in the table are presented in the same way as in Example 1.

TABLE 3

EXAMPLE 3

F. LENGTH F = 1.00~1.22~1.36

| SURFACE No. | R | D | Nd | νd |
|---|---|---|---|---|
| 1 | 2.580 | 0.179 | 1.8052 | 25.42 |
| 2 | 1.658 | 0.382 | | |
| 3* | 7.745 | 0.248 | 1.4910 | 57.58 |
| 4* | 3.196 | 0.307 | | |
| 5 | 3.010 | 0.102 | 1.6180 | 63.33 |
| 6 | 1.485 | 0.681 | | |
| 7 | −2.605 | 0.089 | 1.4970 | 81.54 |
| 8 | 3.113 | D8 | | |
| 9 | 7.541 | 0.486 | 1.7725 | 49.60 |
| 10 | −3.143 | D10 | | |
| 11 | 3.342 | 0.497 | 1.5955 | 39.24 |
| 12 | −1.597 | 0.079 | 1.8467 | 23.78 |
| 13 | −2.473 | D13 | | |
| 14 | −2.305 | 0.069 | 1.7618 | 26.52 |
| 15 | −3.584 | 0.239 | | |
| 16 | 72.995 | 0.064 | 1.4875 | 70.23 |
| 17 | 2.205 | D17 | | |
| 18 | 1.675 | 0.348 | 1.6727 | 32.10 |
| 19 | −2.477 | 0.037 | | |
| 20 | −3.212 | 0.079 | 1.8061 | 33.27 |
| 21 | 1.660 | 0.088 | | |
| 22 | 4.255 | 0.269 | 1.4875 | 70.23 |
| 23 | −2.207 | 0.122 | | |
| 24 | −1.100 | 0.074 | 1.8061 | 33.27 |
| 25 | 2.948 | 0.480 | 1.4970 | 81.54 |
| 26 | −1.690 | 0.010 | | |
| 27 | 10.776 | 0.521 | 1.4970 | 81.54 |
| 28 | −1.789 | D28 | | |
| 29 | 4.318 | 0.321 | 1.6968 | 55.53 |
| 30 | −8.437 | 1.005 | | |
| 31 | ∞ | 1.485 | 1.5163 | 64.14 |
| 32 | ∞ | | | |

| MOV. DISTANCE | WIDE | MIDDLE | TELE |
|---|---|---|---|
| D8 | 0.709 | 0.449 | 0.3401 |
| D10 | 2.125 | 1.655 | 1.4943 |
| D13 | 0.356 | 0.678 | 0.8929 |
| D17 | 0.457 | 0.302 | 0.1040 |
| D28 | 0.024 | 0.587 | 0.8376 |
| PROJ. DISTANCE | 99.316 | 121.165 | 135.070 |

ASPHE. COEFF.

SURFACE No. = 3

| K | A3 | A4 | A5 | A6 |
|---|---|---|---|---|
| 23.92454 | −0.01399 | 0.14212 | 0.07686 | −0.21265 |
| A7 | A8 | A9 | A10 | A11 |
| 0.05794 | 0.09510 | −0.03640 | −0.04475 | 0.03397 |
| A12 | | | | |
| −0.00689 | | | | |

TABLE 3-continued

EXAMPLE 3

SURFACE No. = 4

| K | A3 | A4 | A5 | A6 |
|---|---|---|---|---|
| 2.82614 | −0.00510 | 0.10214 | 0.22440 | −0.43417 |
| A7 | A8 | A9 | A10 | A11 |
| 0.19222 | 0.08545 | −0.03389 | −0.05622 | 0.01928 |
| A12 | | | | |
| 0.00306 | | | | |

*indicates aspherical surface, R value of aspherical surface is paraxial radius of curvature.

Figure 8:
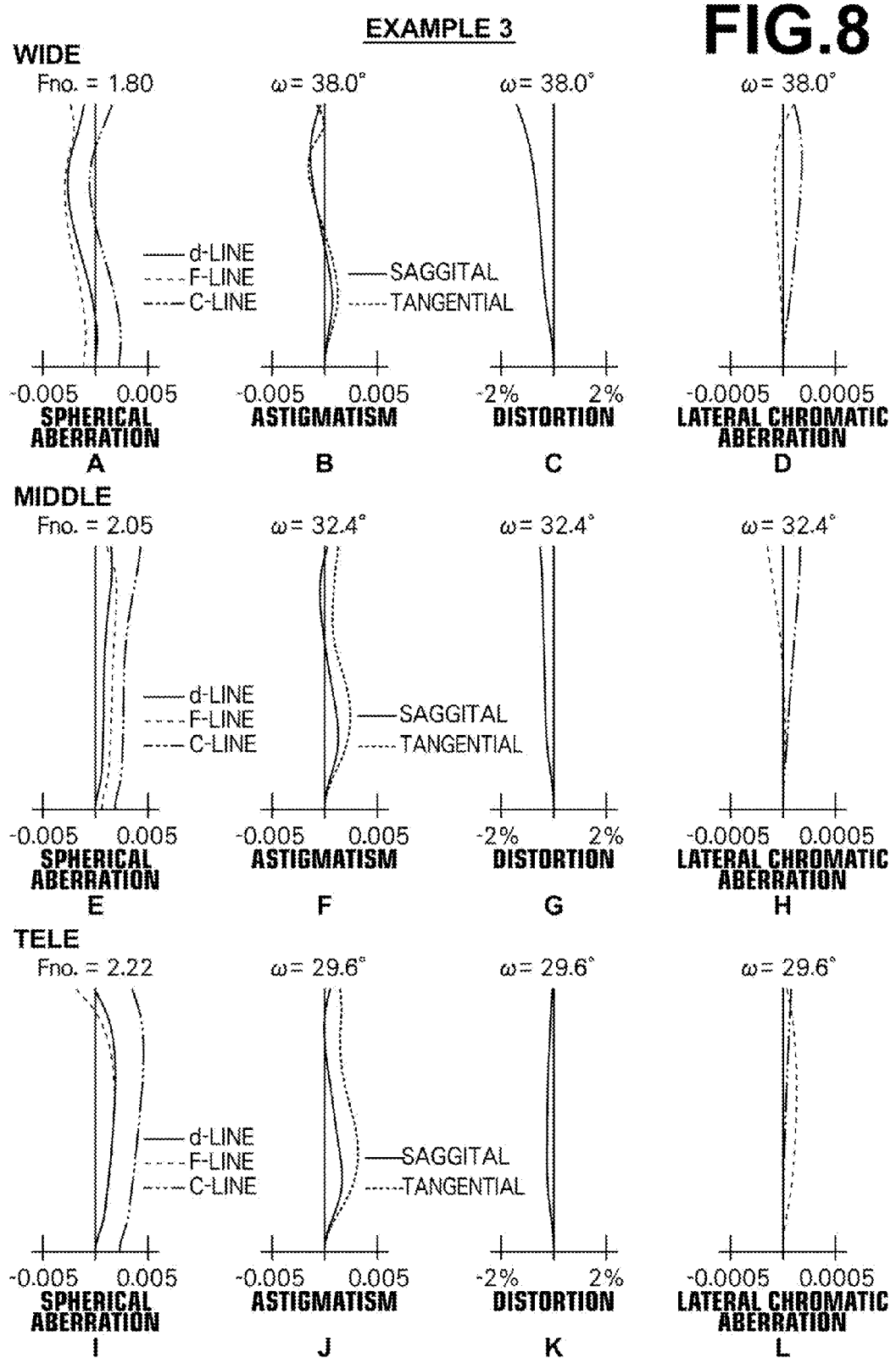
FIG. 8 illustrates various types of aberrations of the projection zoom lens of Example 3.
Figure 12:
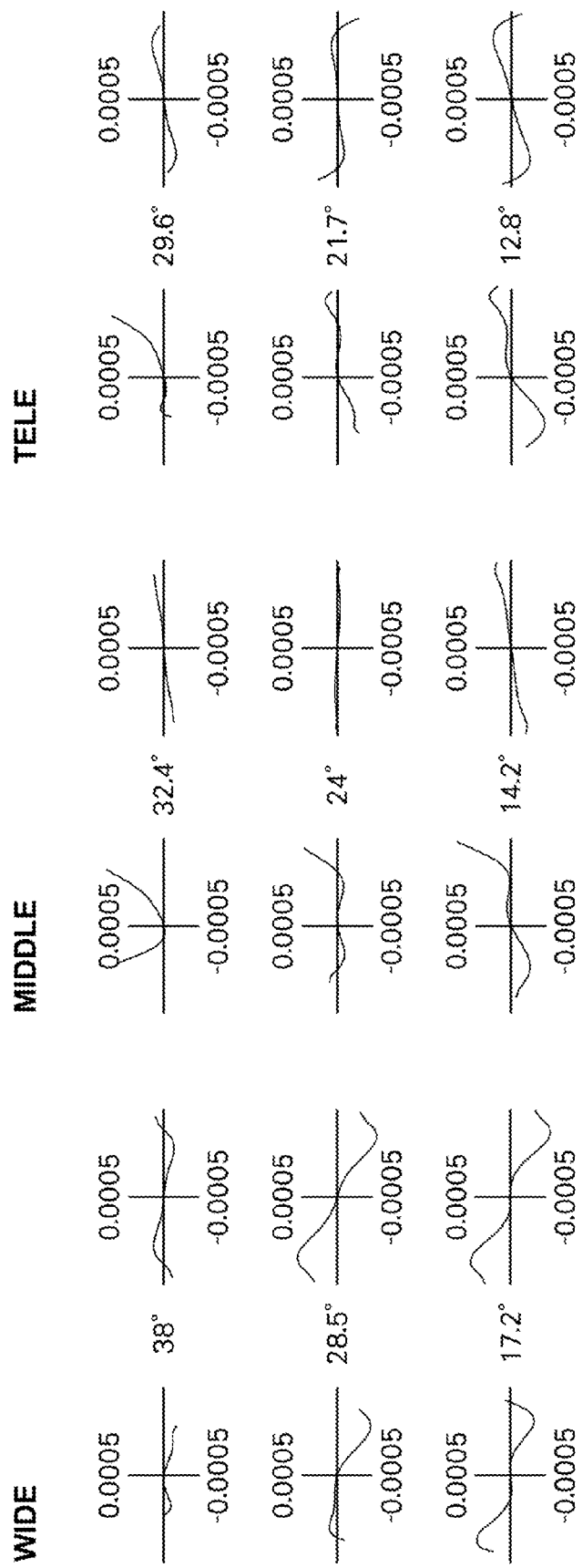
FIG. 12 illustrates lateral aberrations of the projection zoom lens of Example 3.

FIG. 8 illustrates various types of aberrations and FIG. 12 illustrates lateral aberration diagrams of the projection zoom lens of Example 3.These drawings are presented in the same way as in Example 1.

As is known from FIGS. 8, 12, and the like, the projection zoom lens of Example 3 has a wide angle of view 2ω of 76.0 degrees with a bright F value of 1.80, and each aberration is corrected satisfactorily.

As is known from Table 5 that indicates the value of each of the conditional expressions for each example, the projection zoom lens of Example 3 satisfies all of the conditional expressions (1) to (4). Such six group projection zoom lens of Example 3 allows downsizing with a broadened angle of view while various types of aberrations are satisfactorily corrected over the entire zoom range.

Example 4

FIGS. 5A, 5B illustrate a projection zoom lens of Example 4. FIG. 5A illustrates the projection zoom lens in detail and FIG. 5B comparatively illustrates the positions of each lens group of the projection zoom lens of Example 4 at the wide angle end (indicated by "WIDE" in the drawing) and telephoto end (indicated by "TELE" in the drawing). The projection zoom lens of Example 4 also includes six les groups.

The first lens group G1 is composed of three lenses of a first group first lens L1 to a first group third lens L3, the second lens group G2 is composed of one lens of a second group first lens L4, the third lens group G3 is composed of two lenses of a third group first lens L5 and a third group second lens L6.

The fourth lens group G4 is composed of two lenses of a fourth group first lens L7 and a fourth group second lens L8, the fifth lens group G5 is composed of six lenses of a fifth group first lens L9 to fifth group sixth lens L14, and the sixth lens group G6 is composed of one lens of a sixth group first lens L15.

The third group first lens L5 and the third group second lens L6 are cemented, and fifth group fourth lens L12 and the fifth group fifth lens L13 are cemented, thereby each forming a cemented lens.

The Lens data and other data of the projection zoom lens of Example 4 are shown in Table 4. The lens data and other data in the table are presented in the same way as in Example 1.

TABLE 4

EXAMPLE 4

F. LENGTH F = 1.00~1.22~1.36

| SURFACE No. | R | D | Nd | vd |
|---|---|---|---|---|
| 1 | 2.823 | 0.225 | 1.8010 | 34.97 |
| 2 | 1.486 | 0.375 | | |
| 3* | 2.849 | 0.261 | 1.4910 | 57.58 |
| 4* | 1.187 | 0.816 | | |
| 5 | −2.650 | 0.095 | 1.4970 | 81.54 |
| 6 | 2.938 | D6 | | |
| 7 | 7.213 | 0.463 | 1.8040 | 46.57 |
| 8 | −3.313 | D8 | | |
| 9 | 3.403 | 0.434 | 1.5814 | 40.75 |
| 10 | −1.708 | 0.082 | 1.8467 | 23.78 |
| 11 | −2.594 | D11 | | |
| 12 | −2.028 | 0.073 | 1.7618 | 26.52 |
| 13 | −2.895 | 0.213 | | |
| 14 | 136.147 | 0.072 | 1.6204 | 60.29 |
| 15 | 2.708 | D15 | | |
| 16 | 1.599 | 0.347 | 1.6727 | 32.10 |
| 17 | −2.479 | 0.032 | | |
| 18 | −3.319 | 0.069 | 1.8000 | 29.84 |
| 19 | 1.704 | 0.089 | | |
| 20 | 3.922 | 0.264 | 1.4875 | 70.23 |
| 21 | −2.103 | 0.101 | | |
| 22 | −1.195 | 0.075 | 1.8061 | 33.27 |
| 23 | 2.305 | 0.476 | 1.4970 | 81.54 |
| 24 | −1.836 | 0.010 | | |
| 25 | 6.883 | 0.467 | 1.4970 | 81.54 |
| 26 | −2.038 | D26 | | |
| 27 | 4.949 | 0.281 | 1.8061 | 33.27 |
| 28 | −9.796 | 0.961 | | |
| 29 | ∞ | 1.488 | 1.5163 | 64.14 |
| 30 | ∞ | | | |

| MOV. DISTANCE | WIDE | MIDDLE | TELE |
|---|---|---|---|
| D6 | 0.668 | 0.443 | 0.3510 |
| D8 | 2.154 | 1.653 | 1.4857 |
| D11 | 0.514 | 0.871 | 1.1049 |
| D15 | 0.391 | 0.286 | 0.1040 |
| D26 | 0.014 | 0.485 | 0.6919 |
| PROJ. DISTANCE | 99.524 | 121.419 | 135.352 |

ASPHE. COEFF.

SURFACE No. = 3

| K | A3 | A4 | A5 | A6 |
|---|---|---|---|---|
| 3.80853 | −0.00841 | 0.02524 | 0.11841 | −0.24839 |
| A7 | A8 | A9 | A10 | A11 |
| 0.09359 | 0.09152 | −0.05901 | −0.04528 | 0.04847 |
| A12 | | | | |
| −0.01238 | | | | |

SURFACE No. = 4

| K | A3 | A4 | A5 | A6 |
|---|---|---|---|---|
| −0.14697 | −0.00061 | 0.05109 | 0.19728 | −0.34373 |
| A7 | A8 | A9 | A10 | A11 |
| 0.11190 | 0.08015 | 0.01250 | −0.05993 | −0.03007 |
| A12 | | | | |
| 0.03281 | | | | |

*indicates aspherical surface, R value of aspherical surface is paraxial radius of curvature.

Figure 9:
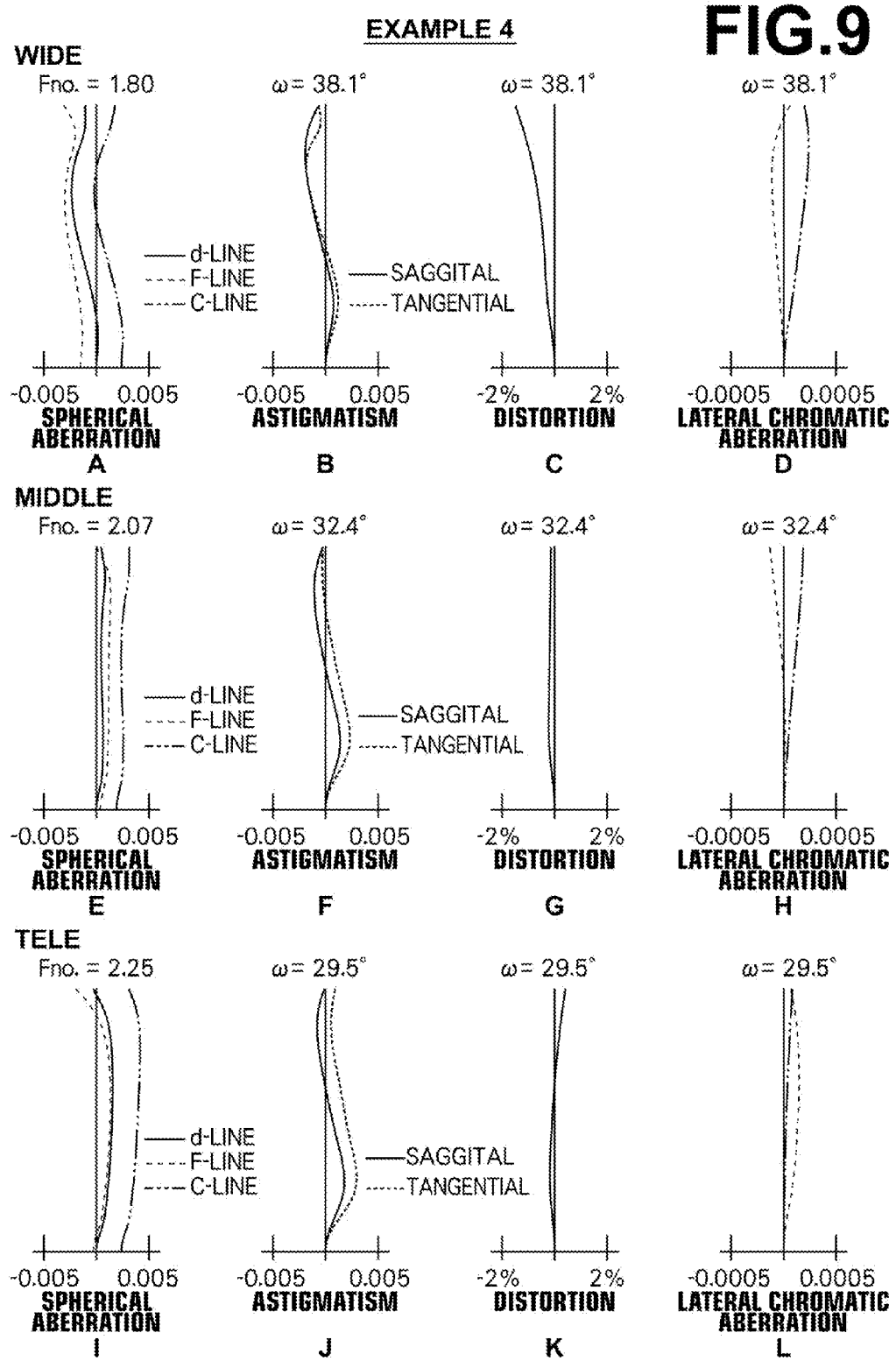
FIG. 9 illustrates various types of aberrations of the projection zoom lens of Example 4.
Figure 13:
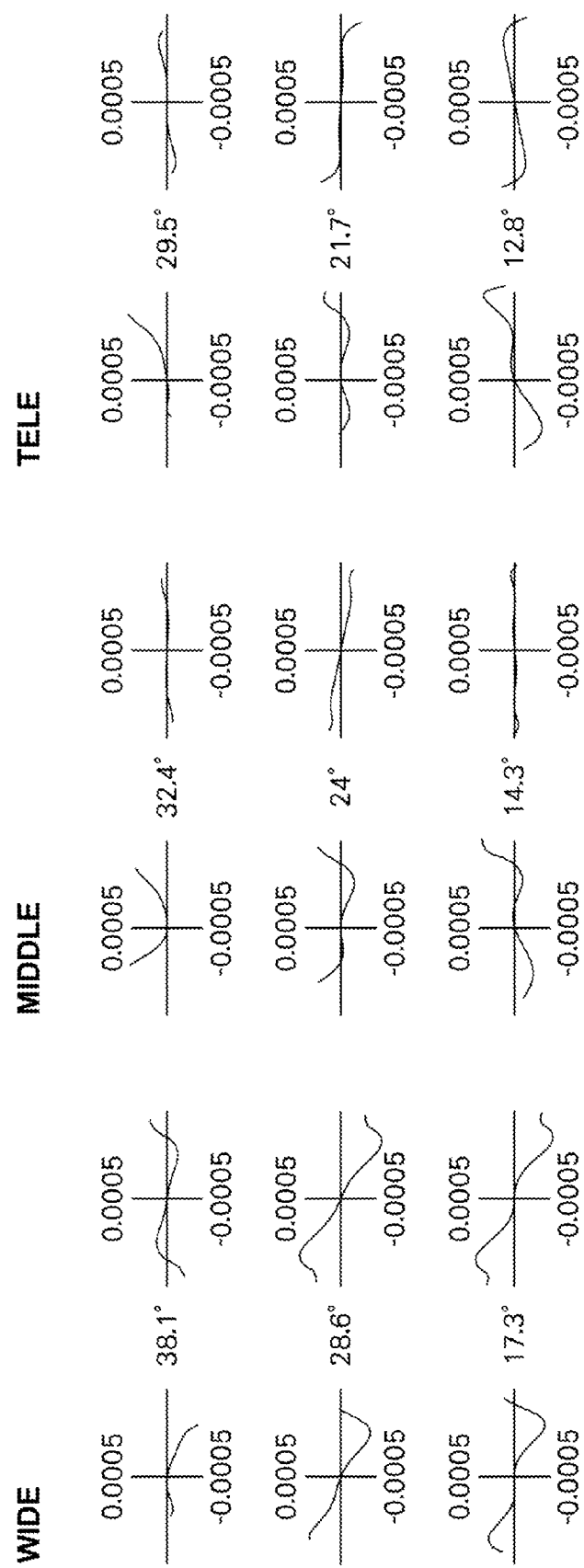
FIG. 13 illustrates lateral aberrations of the projection zoom lens of Example 4.

FIG. 9 illustrates various types of aberrations and FIG. 13 illustrates lateral aberration diagrams of the projection zoom lens of Example 4.These drawings are presented in the same way as in Example 1.

As is known from FIGS. 9, 13, and the like, the projection zoom lens of Example 4 has a wide angle of view 2ω of 76.0 degrees with a bright F value of 1.80, and each aberration is corrected satisfactorily.

As is known from Table 5 that indicates the value of each of the conditional expressions for each example, the projection zoom lens of Example 4 satisfies all of the conditional expressions (1) to (4). Such six group projection zoom lens of Example 4 allows downsizing with a broadened angle of view while various types of aberrations are satisfactorily corrected over the entire zoom range.

The present invention is not limited to each of the examples described above, and various alternative examples are possible without departing from the spirit of the present invention. For example, values of radius of curvature of each lens, surface distance, refractive index, and the like are not limited to those shown in each table and may take other values.

TABLE 5

|  | C. EXP. (1) (R51a + R51b)/ (R51a − R51b) | C. EXP. (2) vd51 | C. EXP. (3) f5/fw | C. EXP. (4) 2ω |
|---|---|---|---|---|
| EXAMPLE 1 | −0.31 | 37.00 | 3.93 | 76.80 |
| EXAMPLE 2 | −0.59 | 39.24 | 4.37 | 79.80 |
| EXAMPLE 3 | −0.19 | 32.10 | 4.92 | 76.00 |
| EXAMPLE 4 | −0.22 | 32.10 | 4.38 | 76.20 |
| UPPER LIMIT |  | 25.00 | 2.00 | 70.00 |
| LOWER LIMIT | 0.00 | 45.00 | 7.00 |  |

What is claimed is:

1. A projection zoom lens substantially consisting of a first lens group having a negative power, a second lens group having a positive power, a third lens group having a positive power, a fourth lens group having a negative power, a fifth lens group having a positive power, and a sixth lens group having a positive power arranged in this order from the magnification side and is configured telecentric on the reduction side, wherein:
the projection zoom lens is configured such that the first and sixth lens groups are fixed while the second to fifth lens groups are moved independently of each other along the optical axis at the time of zooming;
the fifth lens group is composed of a plurality of lenses and a biconvex lens is disposed on the most magnification side; and
the zoom lens satisfies conditional expressions (1) and (2) given below:

$$(R51a+R51b)/(R51a-R51b) \leq 0 \quad (1) \text{ and}$$

$$25.0 < vd51 < 45.0 \quad (2),$$

where:
R51$a$ is a radius of curvature of the magnification side surface of the lens disposed on the most magnification side in the fifth lens group;
R51$b$ is a radius of curvature of the reduction side surface of the lens disposed on the most magnification side in the fifth lens group; and
vd51 is an Abbe number of the lens disposed on the most magnification side in the fifth lens group with respect to d-line.

2. The projection zoom lens of claim 1, wherein the fifth lens group is composed of six lenses of a biconvex lens, a negative lens with a concave surface on the reduction side, a positive lens, a negative lens with a concave surface on the magnification side, a positive lens with a convex surface on the reduction side, and a positive lens with a convex surface on the reduction side arranged in this order from the magnification side.

3. A projection zoom lens substantially consisting of a first lens group having a negative power, a second lens group having a positive power, a third lens group having a positive power, a fourth lens group having a negative power, a fifth lens group having a positive power, and a sixth lens group having a positive power arranged in this order from the magnification side and is configured telecentric on the reduction side, wherein:
the projection zoom lens is configured such that the first and sixth lens groups are fixed while the second to fifth lens groups are moved independently of each other along the optical axis at the time of zooming; and
the fifth lens group is composed of six lenses of a biconvex lens, a negative lens with a concave surface on the reduction side, a positive lens, a negative lens with a concave surface on the magnification side, a positive lens with a convex surface on the reduction side, and a positive lens with a convex surface on the reduction side arranged in this order from the magnification side.

4. The projection zoom lens of claim 1, wherein the projection zoom lens satisfies a conditional expression (3) given below:

$$2.0 < f5/fw < 7.0 \quad (3),$$

where:
f5 is a focal length of the fifth lens group; and
fw is a focal length of the entire system at the wide angle end.

5. The projection zoom lens of claim 1, wherein the second lens group is composed of one positive lens with a convex surface on the reduction side.

6. The projection zoom lens of claim 1, wherein the projection zoom lens satisfies a conditional expression (4) given below:

$$2\omega > 70° \quad (4),$$

where 2ω is a total angle of view at the wide angle end.

7. The projection zoom lens of claim 1, wherein the first lens group has at least one aspherical surface.

8. The projection zoom lens of claim 1, wherein all lenses constituting the second to sixth lens groups are spherical lenses.

9. The projection zoom lens of claim 1, wherein focusing is performed by moving the first lens group in an optical axis direction.

10. The projection zoom lens of claim 1, wherein the projection zoom lens satisfies a conditional expression (1A) given below:

$$(R51a+R51b)/(R51a-R51b) \leq -0.10 \quad (1A).$$

11. The projection zoom lens of claim 1, wherein the projection zoom lens satisfies a conditional expression (1A) given below:

$$30.0 < vd51 < 45.0 \quad (2A).$$

12. The projection zoom lens of claim 4, wherein the projection zoom lens satisfies a conditional expression (3A) given below:

$$3.0 < f5/fw < 6.0 \quad (3A).$$

13. The projection zoom lens of claim 1, wherein the projection zoom lens is configured such that the distance between the first and second lens groups is reduced while the distance between the fifth and sixth lens groups is increased at the time of zooming from the wide angle end to the telephoto end.

14. The projection zoom lens of claim 3, wherein the projection zoom lens satisfies a conditional expression (3) given below:

$$2.0 < f5/fw < 7.0 \quad (3),$$

where:
f5 is a focal length of the fifth lens group; and
fw is a focal length of the entire system at the wide angle end.

15. The projection zoom lens of claim 3, wherein the second lens group is composed of one positive lens with a convex surface on the reduction side.

16. The projection zoom lens of claim 3, wherein the projection zoom lens satisfies a conditional expression (4) given below:

$$2\omega > 70° \quad (4),$$

where $2\omega$ is a total angle of view at the wide angle end.

17. The projection zoom lens of claim 3, wherein the first lens group has at least one aspherical surface.

18. The projection zoom lens of claim 3, wherein the projection zoom lens is configured such that the distance between the first and second lens groups is reduced while the distance between the fifth and sixth lens groups is increased at the time of zooming from the wide angle end to the telephoto end.

19. A projection display apparatus, comprising the projection zoom lens of claim 1, a light source, a light valve, and an illumination optical unit for guiding a luminous flux from the light source to the light valve, wherein the luminous flux from the light source is optically modulated by the light valve and the optically modulated luminous flux is projected onto a screen through the projection zoom lens.

20. A projection display apparatus, comprising the projection zoom lens of claim 3, a light source, a light valve, and an illumination optical unit for guiding a luminous flux from the light source to the light valve, wherein the luminous flux from the light source is optically modulated by the light valve and the optically modulated luminous flux is projected onto a screen through the projection zoom lens.

* * * * *